United States Patent
Uchida

(10) Patent No.: US 8,164,301 B2
(45) Date of Patent: Apr. 24, 2012

(54) CHARGING CONTROL APPARATUS FOR ELECTRICALLY POWERED VEHICLE, ELECTRICALLY POWERED VEHICLE, METHOD FOR CHARGING CONTROL FOR ELECTRICALLY POWERED VEHICLE, AND COMPUTER-READABLE RECORDING MEDIUM HAVING PROGRAM RECORDED THEREON FOR COMPUTER TO EXECUTE THE CHARGING CONTROL

(75) Inventor: Masatoshi Uchida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 401 days.

(21) Appl. No.: 12/450,324

(22) PCT Filed: Mar. 27, 2008

(86) PCT No.: PCT/JP2008/056654
§ 371 (c)(1),
(2), (4) Date: Sep. 22, 2009

(87) PCT Pub. No.: WO2008/132947
PCT Pub. Date: Nov. 6, 2008

(65) Prior Publication Data
US 2010/0102776 A1    Apr. 29, 2010

(30) Foreign Application Priority Data
Apr. 25, 2007 (JP) ................. 2007-115889

(51) Int. Cl.
*H01M 10/46* (2006.01)

(52) U.S. Cl. .................................... 320/109
(58) Field of Classification Search .......... 320/104, 320/107, 109, 115; 700/286; 701/22; 705/13, 705/14.25, 14.37, 400, 403
See application file for complete search history.

(56) References Cited

U.S. PATENT DOCUMENTS
7,679,336 B2 * 3/2010 Gale et al. ............... 320/155
7,948,207 B2 * 5/2011 Scheucher ............... 320/104

FOREIGN PATENT DOCUMENTS
| JP | A-5-227669 | 9/1993 |
| JP | A-8-37703 | 2/1996 |
| JP | A-2004-79316 | 3/2004 |
| JP | A-2005-172582 | 6/2005 |
| JP | A-2006-197765 | 7/2006 |
| JP | A-2006-275869 | 10/2006 |
| JP | A-2007-62638 | 3/2007 |

* cited by examiner

*Primary Examiner* — Edward Tso
(74) *Attorney, Agent, or Firm* — Oliff & Berridge, PLC

(57) ABSTRACT

An energy cost prediction unit predicts an energy cost for the next travel. A lifetime prediction unit uses a charge amount—lifetime map to predict the lifetime of a power storage device according to an amount of charge to the power storage device. A usage cost prediction unit predicts the cost of using the power storage device according to the amount of charge to the power storage device, based on the lifetime of the power storage device predicted by the lifetime prediction unit. The predicted cost associated with the amount of charge to the power storage device is indicated on a display device. In accordance with an instruction from a user, the power storage device is charged from a charging station.

14 Claims, 13 Drawing Sheets

CHARGING CONTROL APPARATUS FOR ELECTRICALLY POWERED VEHICLE, ELECTRICALLY POWERED VEHICLE, METHOD FOR CHARGING CONTROL FOR ELECTRICALLY POWERED VEHICLE, AND COMPUTER-READABLE RECORDING MEDIUM HAVING PROGRAM RECORDED THEREON FOR COMPUTER TO EXECUTE THE CHARGING CONTROL

TECHNICAL FIELD

The present invention relates to charging control for an electrically powered vehicle configured in such a manner that a power storage device mounted on the vehicle is chargeable from a power supply located outside the vehicle.

BACKGROUND ART

In recent years, the hybrid vehicle has been of interest as an environment-friendly vehicle. The hybrid vehicle is mounted with, in addition to a conventional engine, an electric motor supplied with electric power from a power storage device to generate a drive force for causing the vehicle to travel, and an electrical generator capable of charging the power storage device with electric power generated from an engine output.

A hybrid vehicle mounted with an electrical generator as described above and configured in such a manner that its power storage device is chargeable from a power supply outside the vehicle, like an electric vehicle without being mounted with an engine, is known (see, for example, Japanese Patent Laying-Open No. 08-037703).

Regarding the hybrid vehicle chargeable from an external power supply as disclosed in Japanese Patent Laying-Open No. 08-037703, the electrical energy can be supplied directly from the outside of the vehicle, so that the travel distance over which the vehicle can travel using only the motor while stopping the engine increases.

The amount of charge supplied to the hybrid vehicle from the outside of the vehicle can be increased to reduce the fuel consumption of the engine, so that the vehicle can travel in environment-friendly manner. In terms of the cost, while the fuel cost for the engine decreases, the cost for electric power necessary for charging increases and the load resulting from the charging is exerted on the power storage device to cause the power storage device to further degrade. The cost of using the power storage device therefore relatively increases.

On the contrary, if the amount of charge from the outside of the vehicle is decreased, the fuel consumption of the engine increases, so that the rate of contribution to the environment protection decreases. In terms of the cost, while the fuel cost for the engine increases, the cost of electric power necessary for charging decreases and the load on the power storage device accordingly decreases. Degradation of the power storage device is thus restrained. The cost of using the power storage device is therefore relatively decreases.

In order to further promote the prevalence of the electrically powered vehicle such as hybrid vehicle in the future, it is important to consider evaluation in terms of the cost as well as the environment. In particular, for the electrically powered vehicle chargeable from a power supply outside the vehicle, it is important to create a mechanism that can determine the amount of charge to the power storage device from a power supply outside the vehicle, in consideration of the cost of using the power storage device in addition to the energy cost.

DISCLOSURE OF THE INVENTION

The present invention has been made to solve the above-described problem, and an object of the invention is to provide a charging control apparatus for an electrically powered vehicle as well as an electrically powered vehicle that allow a user to select an amount of charge from a power supply outside the vehicle to a power storage device, in consideration of the cost of using the power storage device together with the energy cost.

Another object of the present invention is to provide a method for charging control for an electrically powered vehicle that allows a user to select an amount of charge from a power supply outside the vehicle to a power storage device, in consideration of the cost of using the power storage device together with the energy cost, and to provide a computer-readable recording medium having a program recorded thereon for a computer to execute the charging control.

According to the present invention, a charging control apparatus for an electrically powered vehicle refers to a charging control apparatus for an electrically powered vehicle configured in such a manner that a power storage device mounted on the vehicle is chargeable from a power supply outside the vehicle, and the charging control apparatus includes an energy cost prediction unit, a lifetime prediction unit, a usage cost prediction unit, an information unit, and a charge command generation unit. The energy cost prediction unit predicts an energy cost for a next travel of the vehicle based on an energy consumption during a travel of the vehicle. The lifetime prediction unit predicts a lifetime of the power storage device according to an amount of charge to the power storage device, using a relation between an amount of charge to the power storage device and a lifetime of the power storage device. The usage cost prediction unit predicts a cost of using the power storage device according to the amount of charge to the power storage device, based on the lifetime of the power storage device predicted by the lifetime prediction unit. The information unit informs a user of the energy cost and the cost of using the power storage device in association with the amount of charge to the power storage device. The charge command generation unit generates a command to charge the power storage device from the power supply outside the vehicle in accordance with an instruction from the user.

Preferably, the electrically powered vehicle includes an internal combustion engine, an electric power generation device, the power storage device, an electric motor, a travel record collection unit, and a charging device. The electric power generation device is configured to be able to generate electric power using an output of the internal combustion engine. The power storage device is capable of storing the electric power generated by the electric power generation device. The electric motor generates a drive force for causing the vehicle to travel, from the electric power received from the power storage device. The travel record collection unit collects and stores a travel record during a travel of the vehicle. The charging device is configured to be able to charge the power storage device with electric power received from the power supply outside the vehicle. The energy cost prediction unit calculates a fuel consumption of the internal combustion engine and an electric power consumption of the power storage device based on the travel record collected by the travel record collection unit, and predicts a fuel cost and an electric power cost for the next travel based on the calculated fuel consumption and the calculated electric power consumption. The lifetime prediction unit predicts the lifetime of the power storage device using the calculated electric power consumption of the power storage device as the amount of charge with which the power storage device is charged by the charging device.

Still preferably, the electrically powered vehicle includes an internal combustion engine, an electric power generation device, the power storage device, an electric motor, a navigation device, and a charging device. The electric power generation device is configured to be able to generate electric power using an output of the internal combustion engine. The power storage device is capable of storing the electric power generated by the electric power generation device. The electric motor generates a drive force for causing the vehicle to travel, from the electric power received from the power storage device. The navigation device is capable of setting a travel route. The charging device is configured to be able to charge the power storage device with electric power received from the power supply outside the vehicle. The energy cost prediction unit calculates a fuel consumption of the internal combustion engine and an electric power consumption of the power storage device based on the travel route set by the navigation device, and predicts a fuel cost and an electric power cost for the next travel based on the calculated fuel consumption and the calculated electric power consumption. The lifetime prediction unit predicts the lifetime of the power storage device using the calculated electric power consumption of the power storage device as the amount of charge with which the power storage device is charged by the charging device.

Preferably, the electrically powered vehicle further includes a travel mode control unit. The travel mode control unit controls switching of a travel mode including a first mode where a target of a state amount (SOC) indicating a state of charge of the power storage device is not set and a second mode where the target of the state amount (SOC) is set.

More preferably, the travel mode control unit sets the travel mode to the first mode after completion of charging of the power storage device by the charging device, switches the travel mode to the second mode when the state amount (SOC) decreases to approach a specified value indicating the target of the state amount (SOC), and thereafter controls electric power generation by the electric power generation device in such a manner that the state amount (SOC) is around the specified value.

Further, according to the present invention, an electrically powered vehicle includes a chargeable and dischargeable power storage device, an electric motor, a charging device, an energy cost prediction unit, a lifetime prediction unit, a usage cost prediction unit, an information unit, and a charging control unit. The electric motor generates a drive force for causing the vehicle to travel, from electric power received from the power storage device. The charging device is configured to be able to charge the power storage device with electric power received from a power supply outside the vehicle. The energy cost prediction unit predicts an energy cost for a next travel of the vehicle based on an energy consumption during a travel of the vehicle. The lifetime prediction unit predicts a lifetime of the power storage device according to an amount of charge to the power storage device, using a relation between an amount of charge to the power storage device and a lifetime of the power storage device. The usage cost prediction unit predicts a cost of using the power storage device according to the amount of charge to the power storage device, based on the lifetime of the power storage device predicted by the lifetime prediction unit. The information unit informs a user of the energy cost and the cost of using the power storage device in association with the amount of charge to the power storage device. The charging control unit controls charging to the power storage device from the power supply outside the vehicle by the charging device in accordance with an instruction from the user.

Preferably, the electrically powered vehicle further includes an internal combustion engine, an electric power generation device and a travel record collection unit. The electric power generation device is configured to be able to generate electric power using an output of the internal combustion engine. The travel record collection unit collects and stores a travel record during a travel of the vehicle. The power storage device is able to store the electric power generated by the electric power generation device. The energy cost prediction unit calculates a fuel consumption of the internal combustion engine and an electric power consumption of the power storage device based on the travel record collected by the travel record collection unit, and predicts a fuel cost and an electric power cost for the next travel based on the calculated fuel consumption and the calculated electric power consumption. The lifetime prediction unit predicts the lifetime of the power storage device using the calculated electric power consumption of the power storage device as the amount of charge with which the power storage device is charged by the charging device.

Still preferably, the electrically powered vehicle further includes an internal combustion engine, an electric power generation device and a navigation device. The electric power generation device is configured to be able to generate electric power using an output of the internal combustion engine. The navigation device is capable of setting a travel route. The power storage device is able to store the electric power generated by the electric power generation device. The energy cost prediction unit calculates a fuel consumption of the internal combustion engine and an electric power consumption of the power storage device based on the travel route set by the navigation device, and predicts a fuel cost and an electric power cost for the next travel based on the calculated fuel consumption and the calculated electric power consumption. The lifetime prediction unit predicts the lifetime of the power storage device using the calculated electric power consumption of the power storage device as the amount of charge with which the power storage device is charged by the charging device.

Preferably, the electrically powered vehicle further includes a travel mode control unit. The travel mode control unit controls switching of a travel mode including a first mode where a target of a state amount (SOC) indicating a state of charge of the power storage device is not set and a second mode where the target of the state amount (SOC) is set.

More preferably, the travel mode control unit sets the travel mode to the first mode after completion of charging of the power storage device by the charging device, switches the travel mode to the second mode when the state amount (SOC) decreases to approach a specified value indicating the target of the state amount (SOC), and thereafter controls electric power generation by the electric power generation device in such a manner that the state amount (SOC) is around the specified value.

Further, according to the present invention, a method for charging control for an electrically powered vehicle refers to a method of charging control for an electrically powered vehicle configured in such a manner that a power storage device mounted on the vehicle is chargeable from a power supply outside the vehicle, including the steps of: predicting an energy cost for a next travel of the vehicle based on an energy consumption during a travel of the vehicle; predicting a lifetime of the power storage device according to an amount of charge to the power storage device, using a relation between an amount of charge to the power storage device and a lifetime of the power storage device; predicting a cost of using the power storage device according to the amount of charge to the power storage device, based on the predicted lifetime of the power storage device; informing a user of the energy cost and the cost of using the power storage device in association with the amount of charge to the power storage device; and generating a command to charge the power storage device from the power supply outside the vehicle in accordance with an instruction from the user.

Preferably, the method for charging control for an electrically powered vehicle further includes the step of collecting a travel record during a travel of the electrically powered vehicle. The electrically powered vehicle includes an internal combustion engine, an electric power generation device, a power storage device, an electric motor, and a charging device. The electric power generation device is configured to be able to generate electric power using an output of the internal combustion engine. The power storage device is capable of storing the electric power generated by the electric power generation device. The electric motor generates a drive force for causing the vehicle to travel, from the electric power received from the power storage device. The charging device is configured to be able to charge the power storage device with electric power received from the power supply outside the vehicle. In the step of predicting an energy cost, a fuel consumption of the internal combustion engine and an electric power consumption of the power storage device are calculated based on the travel record collected in the step of collecting a travel record, and a fuel cost and an electric power cost for the next travel are predicted based on the calculated fuel consumption and the calculated electric power consumption. In the step of predicting a lifetime of the power storage device, the lifetime of the power storage device is predicted using the calculated electric power consumption of the power storage device as the amount of charge with which the power storage device is charged by the charging device.

Further, preferably the electrically powered vehicle includes an internal combustion engine, an electric power generation device, a power storage device, an electric motor, a navigation device, and a charging device. The electric power generation device is configured to be able to generate electric power using an output of the internal combustion engine. The power storage device is capable of storing the electric power generated by the electric power generation device. The electric motor generates a drive force for causing the vehicle to travel, from the electric power received from the power storage device. The navigation device is capable of setting a travel route. The charging device is configured to be able to charge the power storage device with electric power received from the power supply outside the vehicle. In the step of predicting an energy cost, a fuel consumption of the internal combustion engine and an electric power consumption of the power storage device are calculated based on the travel route set by the navigation device, and a fuel cost and an electric power cost for the next travel are predicted based on the calculated fuel consumption and the calculated electric power consumption. In the step of predicting a lifetime of the power storage device, the lifetime of the power storage device is predicted using the calculated electric power consumption of the power storage device as the amount of charge with which the power storage device is charged by the charging device.

Further, according to the present invention, a recording medium refers to a computer-readable recording medium having a program recorded thereon for a computer to execute any charging control for an electrically powered vehicle as described above.

According to the present invention, the energy cost for the next travel is predicted based on the energy consumption during a travel. Further, the relation between the amount of charge to the power storage device and the lifetime of the power storage device is used to predict the lifetime of the power storage device according to the amount of charge to the power storage device. Based on the predicted lifetime of the power storage device, the cost of using the power storage device according to the amount of charge to the power storage device is predicted. The user is informed of the energy cost and the cost of using the power storage device in association with the amount of charge to the power storage device. Following an instruction from the user, a command is issued to charge the power storage device from a power supply outside the vehicle.

The present invention thus allows a user to select an amount of charge to be supplied from a power supply outside the vehicle to the power storage device in consideration of the cost of using the power storage device together with the energy cost.

BEST MODES FOR CARRYING OUT THE INVENTION

Figure 1:
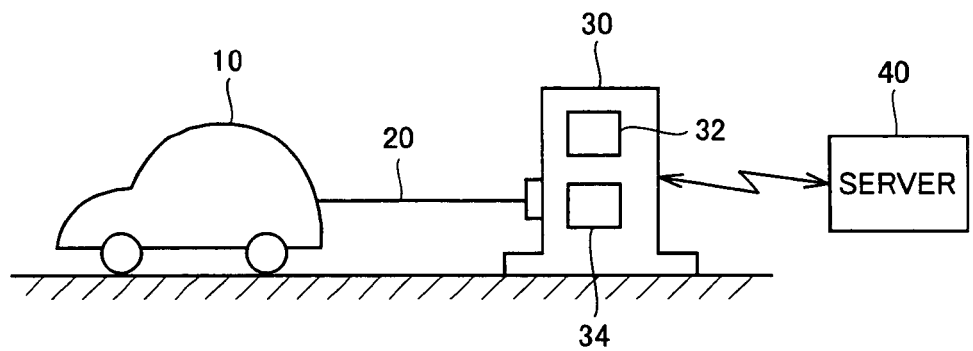
FIG. 1 is an overall view of a charging control system according to a first embodiment of the present invention.

In the following, embodiments of the present invention will be described in detail with reference to the drawings. In the drawings, like or corresponding components are denoted by like reference characters and a description thereof will not be repeated.

First Embodiment

FIG. 1 is an overall view of a charging control system according to a first embodiment of the present invention. Referring to FIG. 1, charging control system 100 includes a vehicle 10, a charging station 30 and a server 40.

Vehicle 10 refers to an electrically-powered vehicle configured in such a manner that a power storage device (not shown) mounted on the vehicle is chargeable from a power supply located outside the vehicle, specifically a hybrid vehicle mounted with an electric motor for causing the vehicle to travel, in addition to an engine. Vehicle 10 can be connected to charging station 30 by a connection cable 20, and receives a charging electric power via connection cable 20 from charging station 30. Vehicle 10 also collects and stores travel records during a travel of the vehicle, and outputs the collected travel records via connection cable 20 to charging station 30, before the power storage device is charged from charging station 30.

Connection cable 20 is an electric power line used for supplying a charging electric power from charging station 30 to vehicle 10. Connection cable 20 is also used as a communication medium for communication to be performed between charging station 30 and vehicle 10.

Charging station 30 is a facility used for supplying a charging electric power to the power storage device of vehicle 10 connected to the station by connection cable 20. Charging station 30 receives for example a system electric power to supply the power to vehicle 10 via connection cable 20.

Charging station 30 includes a charge ECU (Electronic Control Unit) 32 and a display device 34. Charge ECU 32 predicts, for each of a plurality of travel patterns extracted from the travel records of vehicle 10, the energy cost (fuel cost and electric power cost) for the next travel of vehicle 10. Charge ECU 32 also predicts, for each of the above-described travel patterns, the lifetime of the power storage device (the remaining number of times the power storage device can be charged, for example) according to the amount of charge to the power storage device of vehicle 10, and predicts the cost of using the power storage device according to the amount of charge to the power storage device, based on the predicted lifetime. The configuration of charge ECU 32 will be described in detail hereinlater.

Display device 34 presents, for each of a plurality of travel patterns, the energy cost for the next travel and the cost of using the power storage device that are predicted by charge ECU 32, in association with the amount of charge from charging station 30 to vehicle 10. Display device 34 is configured in such a manner that a user can enter selection of an item based on what is presented on the display. The user can select a desired travel pattern (amount of charge) from display device 34, based on the travel cost and the amount of charge from charging station 30 to vehicle 10, presented for each of a plurality of travel patterns.

When the user selects a travel pattern (amount of charge) from display device 34, charge ECU 32 outputs a charge command to vehicle 10 via connection cable 20, so that the power storage device of vehicle 10 is charged from charging station 30 with the amount of charge associated with the selected travel pattern.

Server 40 has various data used for performing a predictive calculation, by charge ECU 32, of the energy cost of vehicle 10 and the cost of using the power storage device, and outputs data necessary for the calculation in response to a request from charge ECU 32. Specifically, server 40 has data such as unit energy price (unit fuel price, unit electric power price) used for calculating the energy cost of vehicle 10, a charge amount—lifetime map used for predicting the lifetime of the power storage device, and the cost of replacement of the power storage device (the price of the power storage device and the cost required for replacement of the power storage device).

<Vehicle Configuration>

Figure 2:
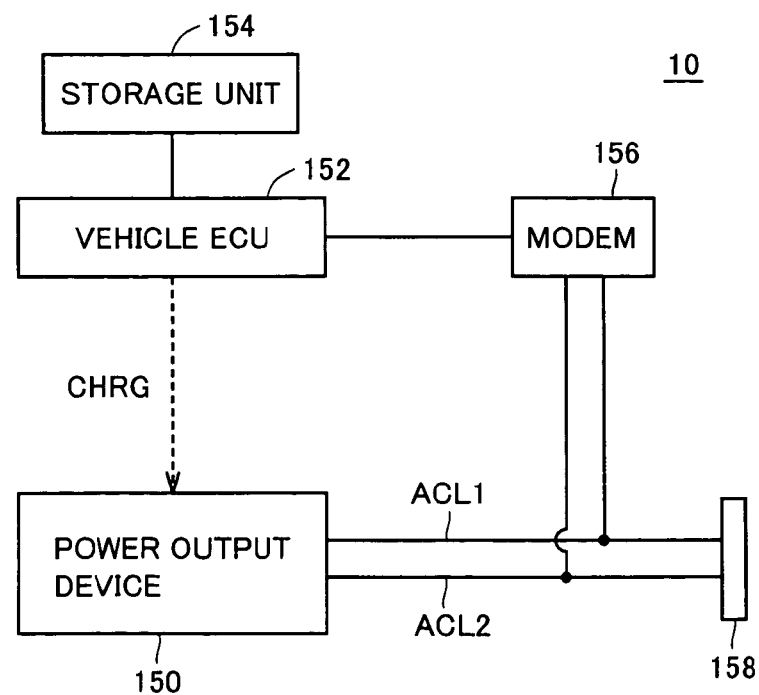
FIG. 2 is a schematic configuration diagram of a vehicle shown in FIG. 1.

FIG. 2 is a schematic configuration diagram of vehicle 10 shown in FIG. 1. Referring to FIG. 2, vehicle 10 includes a power output device 150, a vehicle ECU 152, a storage unit 154, a modem 156, electric power lines ACL1, ACL2, and a connector 158. Electric power lines ACL1, ACL2 correspond to connection cable 20 shown in FIG. 1.

Power output device 150 outputs a drive force for the vehicle. When signal CHRG is activated that represents an instruction to charge the power storage device (not shown) with electric power that is input from connector 158, power output device 150 converts the electric power supplied via electric power lines ACL1, ACL2 into a voltage level of the power storage device to charge the power storage device. The configuration of power output device 150 will be described hereinlater.

Vehicle ECU 152 inactivates signal CHRG that is to be output to power output device 150, when connector 158 is not connected to charging station 30 (FIG. 1) and the vehicle can travel. Vehicle ECU 152 collects travel records during a travel of the vehicle, and outputs the collected travel records to storage unit 154. When connector 158 is connected to charging station 30, vehicle ECU 152 reads the collected travel records from storage unit 154, and uses modem 156 to output the travel records to charging station 30 via electric power lines ACL1, ACL2.

Vehicle ECU 152 activates signal CHRG when receives a charge command from charging station 30 via modem 156. Vehicle ECU 152 inactivates signal CHRG when the power storage device has been charged by the charge amount indicated by the charge command.

Storage unit 154 is a nonvolatile memory storing travel records collected during the travel of the vehicle. Modem 156 is a communication interface for performing data communication between charge ECU 32 (FIG. 1) of charging station 30 and vehicle ECU 152 via electric power lines ACL1, ACL2. Connector 158 is an external charge interface for receiving the charging electric power supplied from charging station 30.

Figure 3:
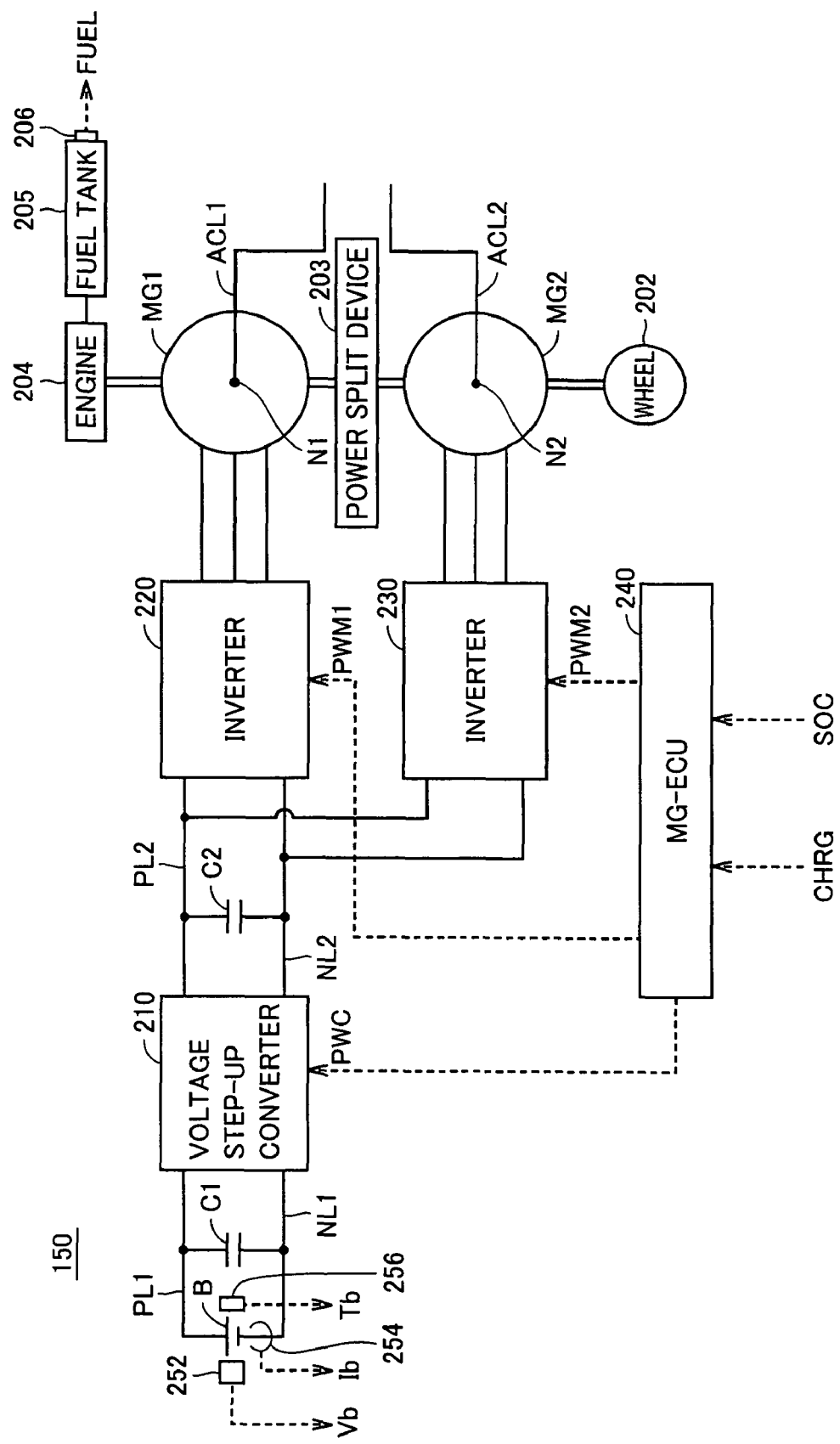
FIG. 3 is a schematic configuration diagram of a power output device shown in FIG. 2.

FIG. 3 is a schematic configuration diagram of power output device 150 shown in FIG. 2. Referring to FIG. 3, power output device 150 includes an engine 204, a fuel tank 205, a fuel sensor 206, motor generators MG1, MG2, a power split device 203, and a wheel 202. Power output device 150 also includes a power storage device B, a voltage step-up converter 210, inverters 220, 230, an MG-ECU 240, capacitors C1, C2, positive lines PL1, PL2, and negative lines NL1, NL2. Power output device 150 further includes a voltage sensor 252, a current sensor 254 and a temperature sensor 256.

Power split device 203 is coupled to engine 204 and motor generators MG1, MG2 to split the power between the engine and motor generators. For example, a planetary gear set having three rotational shafts of a sun gear, a planetary carrier and a ring gear may be used as power split device 203.

The kinetic energy generated by engine 204 is distributed by power split device 203 to wheel 202 and motor generator MG1. Engine 204 is incorporated in power output device 150 to serve as a power source for driving wheel 202 and driving motor generator MG1. Motor generator MG1 is incorporated in power output device 150 to operate as an electrical generator driven by engine 204 and to operate as an electric motor capable of starting engine 204, while motor generator MG2 is incorporated in power output device 150 to serve as a power source for driving wheel 202.

Motor generators MG1, MG2 each include Y-connected three-phase coils (not shown) as stator coils. Electric power line ACL1 is connected to a neutral point N1 of the three-phase coils of motor generator MG1, and electric power line ACL2 is connected to a neutral point N2 of the three-phase coils of motor generator MG2.

Power storage device B is a chargeable DC power source and configured for example with a secondary battery such as nickel-metal-hydride or lithium-ion battery. A large-capacity capacitor may also be employed as power storage device B. As long as the power storage device is an electric power buffer capable of temporarily storing the electric power generated by motor generators MG1, MG2 and the electric power supplied from charging station 30 (FIG. 1) and supplying the stored electric power to motor generator MG2, the power storage device is not limited to a particular one.

Capacitor C1 smoothes a voltage variation between positive line PL1 and negative line NL1. Based on signal PWC from MG-ECU 240, voltage step-up converter 210 steps up the DC voltage supplied from power storage device B, and outputs the stepped up voltage to positive line PL2. Further, voltage step-up converter 210 steps down the DC voltage supplied from inverters 220, 230 via positive line PL2 to a voltage level of power storage device B so as to charge power storage device B. Voltage step-up converter 210 is configured for example with a voltage step-up-and-down-type chopper circuit. Capacitor C2 smoothes a voltage variation between positive line PL2 and negative line NL2.

Inverters 220, 230 are each configured as a three-phase bridge circuit. Based on signal PWM1 from MG-ECU 240, inverter 220 converts the DC voltage supplied from positive line PL2 into a three-phase AC voltage, and outputs the resultant three-phase AC voltage to motor generator MG1. Further, based on signal PWM1, inverter 220 converts the electric power generated by motor generator MG1 from the output of engine 204 into a DC voltage, and outputs the resultant DC voltage to positive line PL2.

Based on signal PWM2 from MG-ECU 240, inverter 230 converts the DC voltage supplied from positive line PL2 into a three-phase AC voltage, and outputs the resultant three-phase AC voltage to motor generator MG2. Thus, motor generator MG2 is driven to generate a specified torque. Further, when the vehicle is braked, inverter 230 receives a rotational force from wheel 202 to convert the three-phase AC voltage generated by motor generator MG2 into a DC voltage based on signal PWM2, and output the resultant DC voltage to positive line PL2.

Further, when power storage device B is charged with the electric power supplied from charging station 30, inverters 220, 230 convert the AC power that is supplied to neutral points N1, N2 via electric power lines ACL1, ACL2 into a DC power based on signals PWM1, PWM2, and output the resultant DC power to positive line PL2.

Motor generators MG1, MG2 are each a three-phase AC electric motor, and configured for example as a three-phase AC synchronous electric motor. Motor generator MG1 generates a three-phase AC voltage from the kinetic energy generated by engine 204, and outputs the generated three-phase AC voltage to inverter 220. Further, motor generator MG1 generates a drive force using the three-phase AC voltage supplied from inverter 220 to start engine 204. Motor generator MG2 generates a drive torque for the vehicle using the three-phase AC voltage supplied from inverter 230. Further, when the vehicle is braked, motor generator MG2 generates a three-phase AC voltage to output the voltage to inverter 230.

Engine 204 converts the thermal energy generated through combustion of the fuel into kinetic energy for moving elements such as piston and rotor, and outputs the resultant kinetic energy to power split device 203. Fuel tank 205 stores the fuel supplied from the outside of the vehicle, and supplies the stored fuel to engine 204. Fuel sensor 206 detects the residual amount of fuel FUEL in fuel tank 205, and outputs the detected value to vehicle ECU 152 (not shown).

Voltage sensor 252 detects voltage Vb of power storage device B, and outputs the detected value to vehicle ECU 152. Current sensor 254 detects current Ib that is input/output to/from power storage device B, and outputs the detected value to vehicle ECU 152. Temperature sensor 256 detects temperature Tb of power storage device B, and outputs the detected value to vehicle ECU 152. The detected values are each stored in storage unit 154 (FIG. 2) as travel records during the travel of the vehicle.

MG-ECU 240 generates signal PWC for driving voltage step-up converter 210, and outputs the generated signal PWC to voltage step-up converter 210. When signal CHRG from vehicle ECU 152 is inactivated, MG-ECU 240 generates signals PWM1, PWM2 for driving motor generators MG1, MG2 respectively, and outputs the generated signals PWM1, PWM2 to inverters 220, 230 respectively.

MG-ECU 240 also controls the travel mode of vehicle 10. Specifically, MG-ECU 240 controls switching between a first travel mode and a second travel mode. The first travel mode refers to a mode in which the target state of charge (the state of charge is hereinafter also referred to as "SOC" which is indicated by a value of 0 to 100% relative to the full state of charge) of power storage device B is not set, and the second travel mode refers to a mode in which the target SOC is set.

In the above-described first travel mode, engine 204 stops unless a large drive force for travel is required such as the one required when the vehicle is to be suddenly accelerated or the vehicle is to climb a hill. Therefore, the first travel mode is also referred to as "motor travel mode" or "EV travel mode" hereinafter. In the second travel mode, in order to control the SOC of power storage device B so that the SOC is at the target value, engine 204 operates intermittently or continuously. Therefore, the second travel mode is also referred to as "hybrid travel mode" or "HV travel mode" hereinafter.

When signal CHRG from vehicle ECU 152 is activated, MG-ECU 240 generates signals PWM1, PWM2 for controlling inverters 220, 230 respectively, so that the AC power from charging station 30 that is supplied to neutral points N1, N2 via electric power lines ACL1, ACL2 is converted into the DC power to charge power storage device B.

Figure 4:
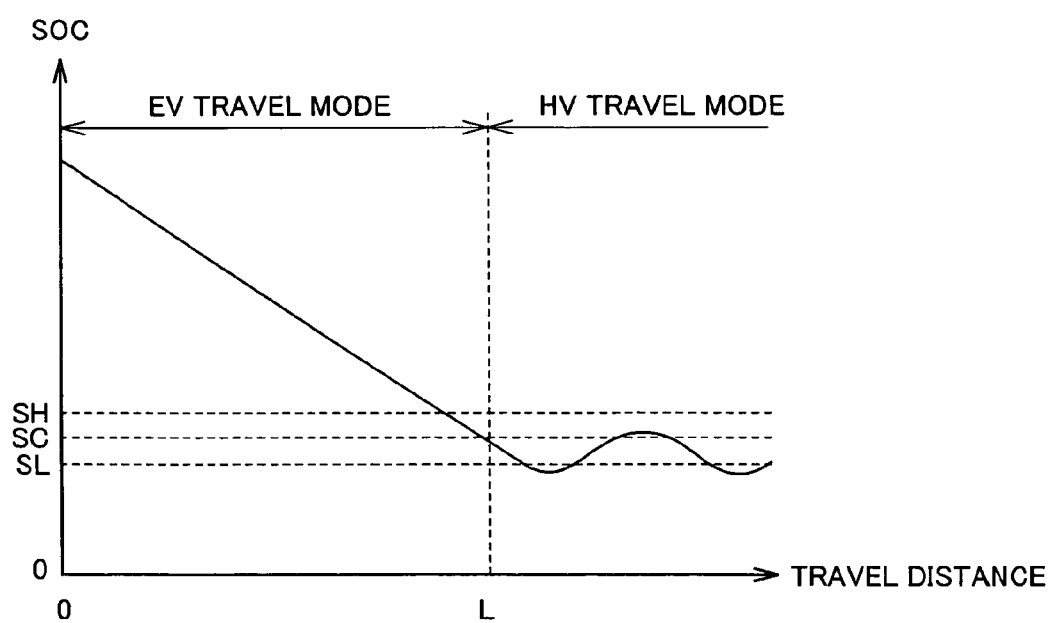
FIG. 4 is a diagram illustrating a relation between the SOC of a power storage device and the travel mode.

FIG. 4 is a diagram illustrating a relation between the SOC of power storage device B and the travel mode. Referring to FIG. 4, it is supposed that a travel of vehicle 10 is started after power storage device B (FIG. 3) is charged from charging station 30 (FIG. 1). After the travel is started, until the SOC of power storage device B becomes smaller than a specified value SC (20% for example), the target SOC is not set and vehicle 10 travels in the EV travel mode. Namely, as long as a large drive force for travel is not required such as the one required when the vehicle is to be suddenly accelerated or the vehicle is to climb a hill, vehicle 10 travels with engine 204 stopped. When the vehicle is decelerated or travels downhill, the SOC could be temporarily increased because of the electric power generated by motor generator MG2. With respect to the whole travel of the vehicle, however, the SOC decreases as the travel distance increases.

When the SOC of power storage device B becomes smaller than specified value SC, the travel mode is switched from the EV travel mode to the HV travel mode, and the SOC is controlled within the range defined by a lower limit SL and an upper limit SH. When the SOC becomes smaller than lower limit SL, engine 204 is started, and power storage device B is charged with the electric power generated by motor generator MG1. After this, when the SOC becomes larger than specified value SC for example, engine 204 is stopped.

Figure 5:
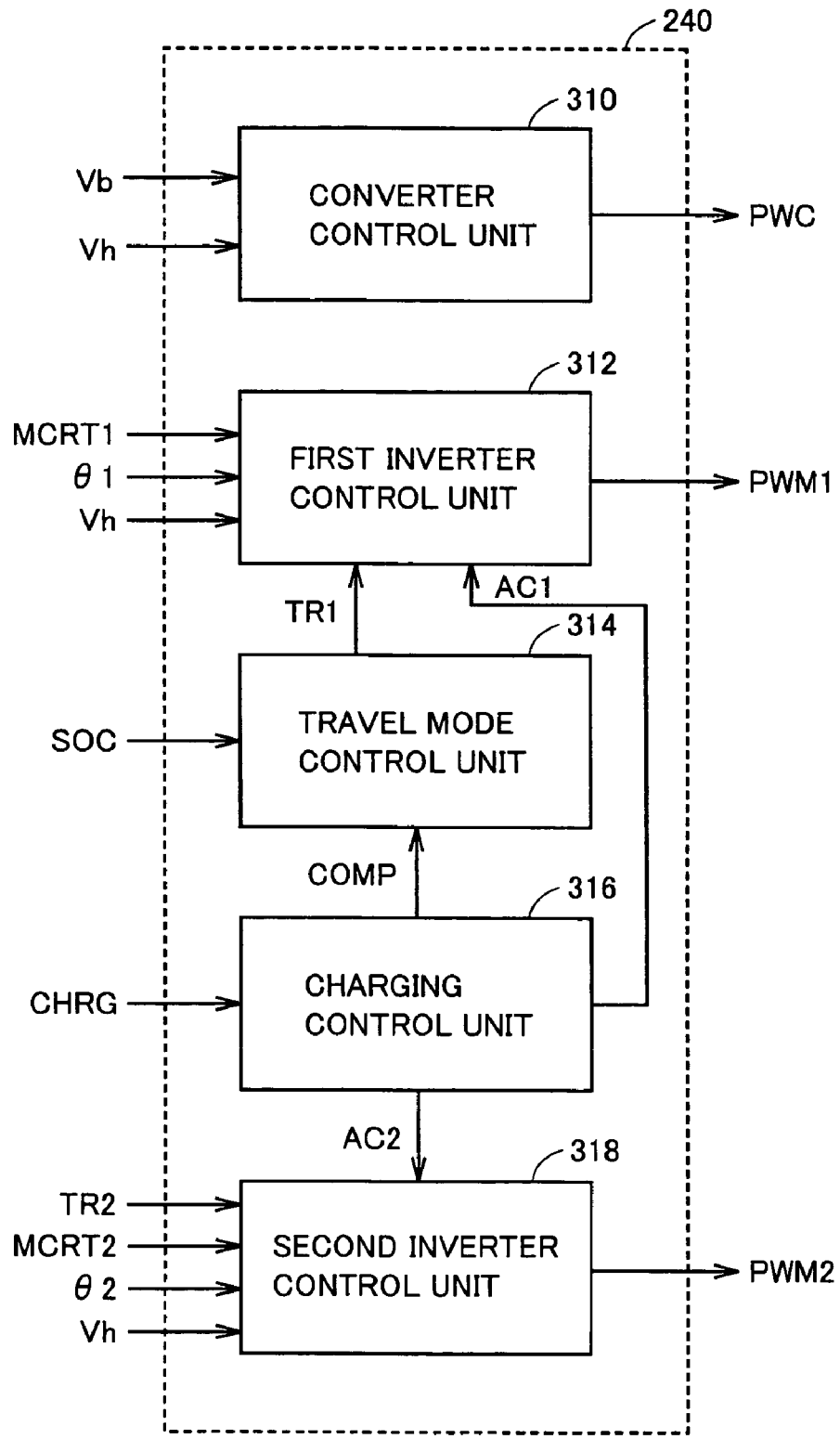
FIG. 5 is a functional block diagram of an MG-ECU shown in FIG. 3.

FIG. 5 is a functional block diagram of MG-ECU 240 shown in FIG. 3. Referring to FIG. 5, MG-ECU 240 includes a converter control unit 310, first and second inverter control units 312, 318, a travel mode control unit 314, and a charging control unit 316.

Converter control unit 310 generates a PWM (Pulse Width Modulation) signal for driving voltage step-up converter 210 based on voltage Vb of power storage device B and voltage Vh between positive line PL2 and negative line NL2, and outputs the generated PWM signal as signal PWC to voltage step-up converter 210.

First inverter control unit 312 generates a PWM signal for driving motor generator MG1 based on motor current MCRT1 and motor rotational angle θ1 of motor generator MG1, voltage Vh, and torque command value TR1 for motor generator MG1 from travel mode control unit 314, and outputs the generated PWM signal as signal PWM1 to inverter 220. Here, motor current MCRT1 and motor rotational angle θ1 are detected by a sensor (not shown).

When power storage device B is charged from charging station 30 (FIG. 1), first inverter control unit 312 generates signal PWM1 based on zero-phase voltage command value AC1 from charging control unit 316, and outputs the generated signal PWM1 to inverter 220.

Second inverter control unit 318 generates a PWM signal for driving motor generator MG2, based on torque command value TR2 for motor generator MG2, motor current MCRT2 and motor rotational angle θ2 of motor generator MG2, and voltage Vh, and outputs the generated PWM signal as signal PWM2 to inverter 230. Here, torque command value TR2 is generated by vehicle ECU 152 (FIG. 2) for example, based on the accelerator pedal position and the vehicle speed, and motor current MCRT2 and motor rotational angle θ2 are detected by a sensor (not shown).

When power storage device B is charged from charging station 30, second inverter control unit 318 generates signal PWM2 based on zero-phase voltage command value AC2 from charging control unit 316, and outputs the generated signal PWM2 to inverter 230.

When travel mode control unit 314 receives from charging control unit 316 charging-completion signal COMP indicating that charging of power storage device B from charging station 30 is completed, travel mode control unit 314 sets the travel mode to the EV travel mode and sets torque command value TR1 to be output to first inverter control unit 312 to zero.

When the SOC of power storage device B becomes smaller than specified value SC in the EV travel mode, travel mode control unit 314 switches the travel mode from the EV travel mode to the HV travel mode. When the SOC of power storage device B becomes smaller than lower limit SL, travel mode control unit 314 generates torque command value TR1 for starting engine 204, and outputs torque command value TR1 to first inverter control unit 312. When engine 204 is started, travel mode control unit 314 generates torque command value TR1 for generating electric power by motor generator MG1, and outputs torque command value TR1 to first inverter control unit 312.

When signal CHRG from vehicle ECU 152 is activated, charging control unit 316 generates zero-phase voltage command values AC1, AC2 for operating motor generators MG1, MG2 and inverters 20, 30 as a single-phase PWM converter, and outputs the generated zero-phase voltage command values AC1, AC2 to first and second inverter control units 312, 318 respectively. When signal CHRG is inactivated, charging control unit 316 outputs charging-completion signal COMP to travel mode control unit 314. A description of zero-phase voltage command values AC1, AC2 will be given hereinlater.

<Process of Collecting Travel Records>

Figure 6:
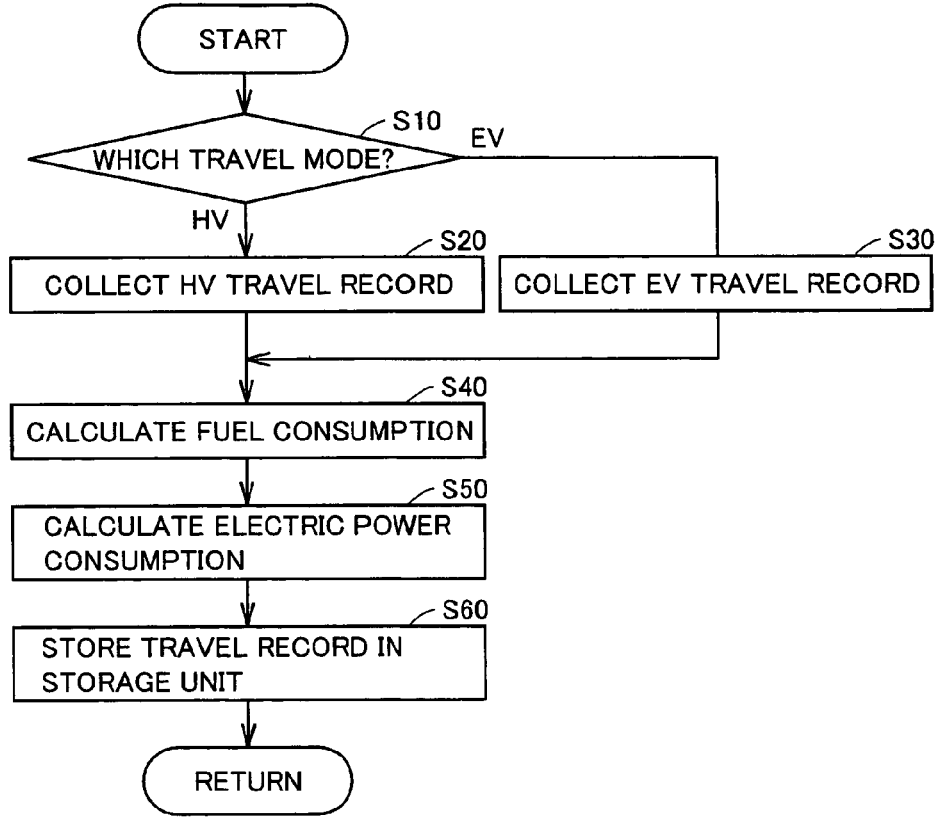
FIG. 6 is a flowchart regarding collection of travel records of the vehicle shown in FIG. 1.

FIG. 6 is a flowchart regarding a process of collecting travel records in vehicle 10 shown in FIG. 1. Here, the process of the flowchart is called from a main routine and executed at regular time intervals or each time a predetermined condition is satisfied.

Referring to FIG. 6, vehicle ECU 152 confirms the travel mode (step S10). When it is determined that the travel mode is the HV travel mode ("HV" in step S10), vehicle ECU 152 collects travel records as HV travel records (step S20). Specifically, vehicle ECU 152 collects records in the HV travel mode such as travel distance and travel time, voltage Vb, current Ib and temperature Tb of power storage device B, and the residual amount of fuel.

In contrast, when it is determined that the travel mode is the EV travel mode ("EV" in step S10), vehicle ECU 152 collects travel records as EV travel records (step S30). Specifically, vehicle ECU 152 collects records in the EV travel mode such as the travel distance and travel time, voltage Vb, current Ib, temperature Tb, and the residual amount of fuel.

Based on the collected record of the residual amount of fuel, vehicle ECU 152 calculates the fuel consumption of engine 204 (step S40). Further, based on the collected records of voltage Vb and current Ib of power storage device B, vehicle ECU 152 calculates the electric power consumption of power storage device B (step S50). Then, vehicle ECU 152 stores the collected travel records (including the calculated fuel consumption of engine 204 and the calculated electric power consumption of power storage device B) in storage unit 154 (step S60). Then, before power storage device B is charged from charging station 30 (FIG. 1), the travel records stored in storage unit 154 are transmitted to charge ECU 32 (FIG. 1) of charging station 30 as described hereinlater.

<Method for Charging Power Storage Device>

Figure 7:
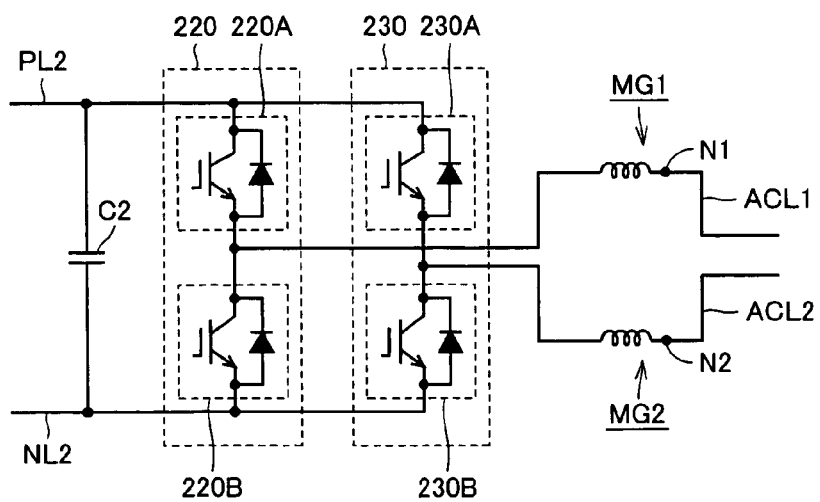
FIG. 7 is a diagram showing a zero-phase equivalent circuit of inverters and motor generators shown in FIG. 3.

FIG. 7 is a diagram showing a zero-phase equivalent circuit of inverters 220, 230 and motor generators MG1, MG2. Referring to FIG. 7, inverters 220, 230 are each configured as a three-phase bridge circuit as described above, and there are eight combination patterns of ON and OFF of six transistors in each inverter. Regarding two of the eight switching patterns, the phase-to-phase voltage is zero and this voltage state is referred to as zero voltage vector. In the case of the zero voltage vector, the three switching elements of the upper arm can be regarded as being in the same switching state (all are ON or OFF), and the three switching elements of the lower arm can also be regarded as being the same switching state.

When power storage device B is charged from charging station 30, the zero voltage vector is controlled in inverters 220, 230 based on zero-phase voltage command values AC1, AC2 each generated by charging control unit 316 (FIG. 5) of MG-ECU 240. Therefore, when power storage device B is charged from charging station 30, the three switching elements of the upper arm of each inverter can be regarded as being in the same switching state, and the three switching elements of the lower arm of the inverter can also be regarded as being in the same switching state. Therefore, in FIG. 7, the three switching elements in the upper arm of inverter 220 are collectively shown as an upper arm 220A, while the three switching elements in the lower arm of inverter 220 are collectively shown as a lower arm 220B. Similarly, the three switching elements in the upper arm of inverter 230 are collectively shown as an upper arm 230A, while the three switching elements in the lower arm of inverter 230 are collectively shown as a lower arm 230B.

As shown in FIG. 7, this zero-phase equivalent circuit can be regarded as a single-phase PWM converter having its input receiving single-phase AC electric power that is supplied to neutral points N1, N2 via electric power lines ACL1, ACL2. Accordingly, the AC electric power that is input from charging station 30 via electric power lines ACL1, ACL2 can be converted into DC electric power to output the DC electric power to positive line PL2 and negative line NL2, by changing the zero voltage vector for inverters 220, 230 each and controlling switching of inverters 220, 230 so that each of the inverters operates as an arm of the single-phase PWM converter.

<Configuration of Charge ECU>

Figure 8:
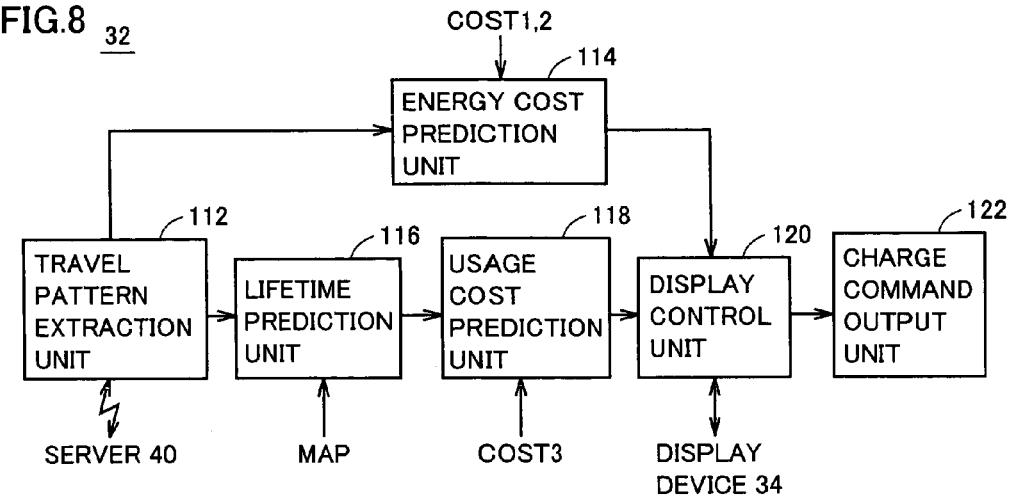
FIG. 8 is a functional block diagram of a charge ECU shown in FIG. 1.

FIG. 8 is a functional block diagram of charge ECU 32 shown in FIG. 1. Referring to FIG. 8, charge ECU 32 includes a travel pattern extraction unit 112, an energy cost prediction unit 114, a lifetime prediction unit 116, a usage cost prediction unit 118, a display control unit 120, and a charge command output unit 122.

Travel pattern extraction unit 112 obtains from vehicle 10 travel records (including the fuel consumption of engine 204 and the electric power consumption of power storage device B) collected in vehicle 10, and extracts a travel pattern of vehicle 10 based on the obtained travel records.

Figure 9:
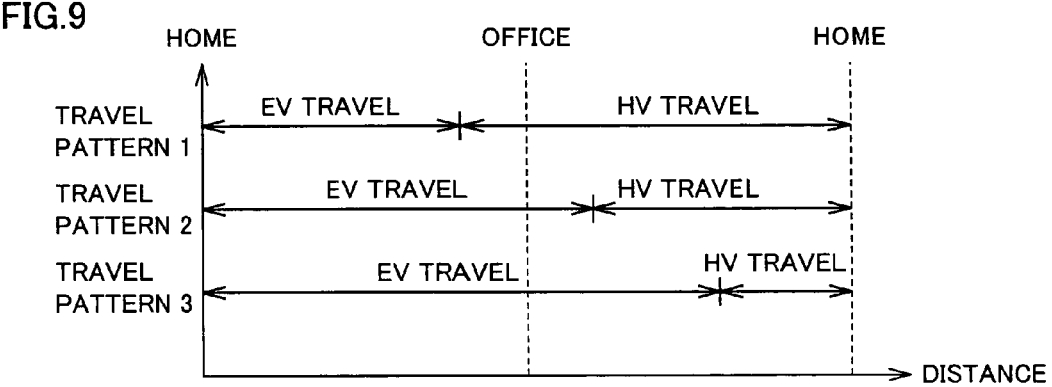
FIG. 9 is a diagram showing exemplary travel patterns extracted by a travel pattern extraction unit.

FIG. 9 is a diagram showing exemplary travel patterns extracted by travel pattern extraction unit 112. FIG. 9 shows an exemplary case where three travel patterns are extracted based on travel records collected during daily travel between home and office.

Referring to FIG. 9, the EV travel distance of travel pattern 1 is relatively shorter than other travel patterns, while the EV travel distance of travel pattern 3 is relatively longer than other travel patterns. In other words, as for travel pattern 1, the HV travel distance is relatively longer and accordingly a larger amount of fuel is consumed by engine 204, and thus the rate of contribution to environmental protection is relatively lower. As for travel pattern 3, the HV travel distance is relatively shorter and accordingly a smaller amount of fuel is consumed by engine 204, and thus travel pattern 3 can be regarded as environment-friendly travel pattern.

In terms of the cost, as for travel pattern 1, the EV travel distance is relatively shorter and accordingly the electric power consumption of power storage device B is smaller and, as for travel pattern 3, the EV travel distance is relatively longer and accordingly the electric power consumption of power storage device B is larger. Here, the electric power consumption of power storage device B corresponds to the amount of charge from charging station 30 to power storage device B. Therefore, in travel pattern 1, the charge cost is relatively lower and the fuel cost is relatively higher and, in travel pattern 3, the charge cost is relatively higher and the fuel cost is relatively lower.

When the amount of charge to power storage device B is larger, a large charge load is exerted on power storage device B, resulting in degradation of power storage device B and shortened lifetime of power storage device B. Thus, the cost of using power storage device B in travel pattern 3 which requires a larger amount of charge is relatively higher than travel pattern 1.

In the first embodiment, the energy cost and the cost of using power storage device B are predicted for a plurality of travel patterns each, and a plurality of proposed amounts of charge (travel patterns) are presented to a user to enable the user to select a proposed amount of charge (travel pattern) as desired.

While FIG. 9 has been described as applied for example to the travel between home and office, a plurality of travel patterns can be extracted based on collected travel records, and a plurality of proposed amounts of charge (travel patterns) can be presented to a user as well, when vehicle 10 is used for other purposes (such as shopping).

Referring again to FIG. 8, energy cost prediction unit 114 predicts the energy cost for each travel pattern extracted by travel pattern extraction unit 112. Specifically, energy cost prediction unit 114 obtains unit fuel price COST1 and unit price of the charging electric power COST2 from server 40, and predicts the fuel cost by multiplying the fuel consumption of engine 204 by unit fuel price COST1 and predicts the electric power cost by multiplying the electric power consumption of power storage device B by unit price of the charging electric power COST2, for each travel pattern.

Lifetime prediction unit 116 predicts the lifetime of power storage device B (the remaining number of times the power storage device can be charged for example) for each of the travel patterns extracted by travel pattern extraction unit 112. Specifically, as the electric power consumption of power storage device B corresponds to the amount of charge from charging station 30 to power storage device B as described above, lifetime prediction unit 116 obtains from server 40 a charge amount—lifetime map MAP showing a relation between the amount of charge to power storage device B and the lifetime of power storage device B, and uses the obtained charge amount—lifetime map MAP to predict the lifetime of power storage device B based on the electric power consumption of power storage device B for each travel pattern.

Figure 10:
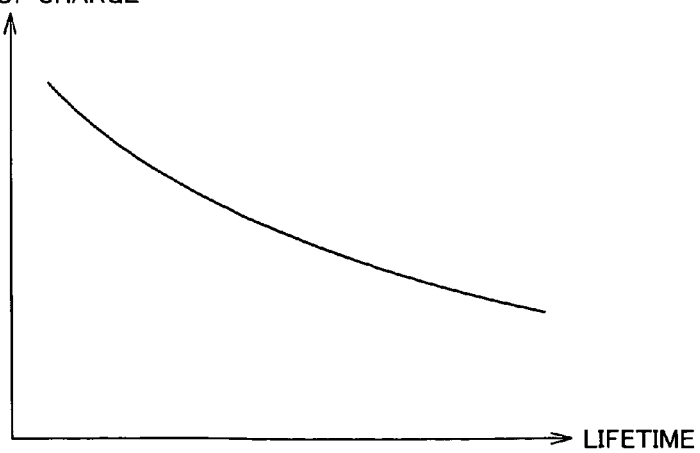
FIG. 10 is a diagram showing an exemplary relation between the amount of charge to a power storage device and the lifetime of the power storage device.

FIG. 10 is a diagram showing an exemplary relation between the amount of charge to power storage device B and the lifetime of power storage device B. Referring to FIG. 10, as the amount of charge to power storage device B is larger, a greater load is exerted on power storage device B, and accordingly power storage device B degrades further and the lifetime of power storage device B is shortened. Here, as the lifetime of power storage device B varies depending on factors such as the SOC and temperature of power storage device B and the degree of the charge rate, server 40 stores a plurality of maps for various conditions of power storage device B.

Referring again to FIG. 8, usage cost prediction unit 118 predicts the cost of using power storage device B for each of the travel patterns extracted by travel pattern extraction unit 112. Specifically, usage cost prediction unit 118 obtains from server 40 replacement cost COST3 of power storage device B (the price of power storage device B and the cost required for replacement of power storage device B), and calculates the cost of using power storage device B by dividing the obtained replacement cost COST3 by the lifetime of power storage device B predicted by lifetime prediction unit 116. In other words, as the lifetime of power storage device B is shorter, the cost of using power storage device B is higher and, as the lifetime of power storage device B is longer, the cost of using power storage device B is lower.

Display control unit 120 outputs to display device 34 the energy cost (fuel cost and electric power cost) predicted by energy cost prediction unit 114 for each travel pattern as well as the cost of using power storage device B predicted by usage cost prediction unit 118 for each travel pattern, and controls the state of display of display device 34.

Figure 11:
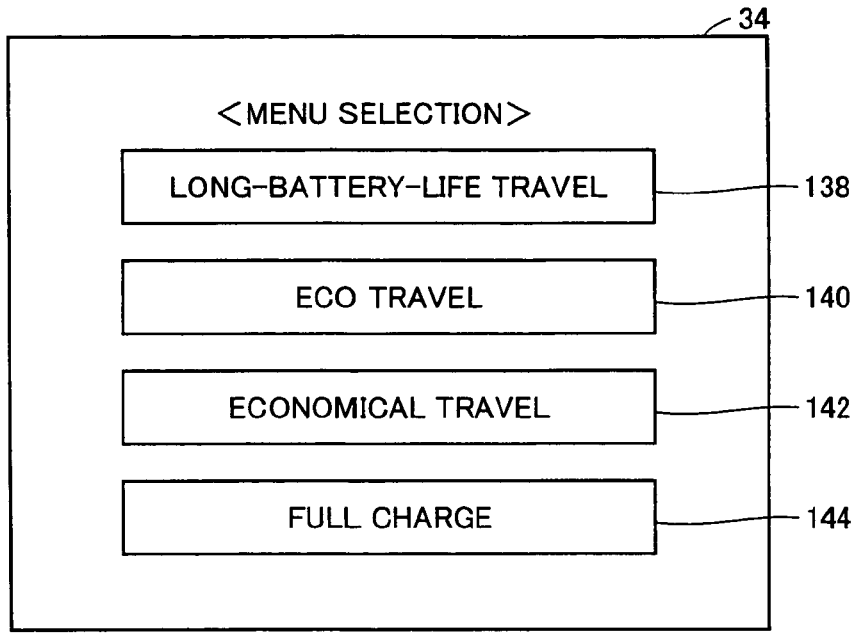
FIG. 11 is a diagram showing an exemplary menu selection screen of a display device.

FIG. 11 is a diagram showing an exemplary menu selection screen of display device 34. Referring to FIG. 11, display device 34 presents a plurality of menu items that can be selected by a user. "Long-Battery-Life Travel" shown in a region 138 corresponds for example to travel pattern 1 shown in FIG. 9. Namely, when this "Long-Battery-Life Travel" is selected, the amount of charge from charging station 30 to power storage device B is kept small.

"ECO Travel" shown in a region 140 corresponds for example to travel pattern 3 shown in FIG. 9. Namely, when this "ECO Travel" is selected, a larger amount of charge is supplied from charging station 30 to power storage device B.

"Economical Travel" shown in a region 142 corresponds to a travel pattern where the energy cost, namely the sum of the fuel cost and the electric power cost is minimum. When this "Economic Travel" is selected, the amount of charge is selected that minimizes the energy cost calculated based on the unit fuel price and the unit price of the charging electric power at the time.

"Full Charge" shown in a region 144 requires that power storage device B is charged until the power storage device is fully charged. When this "Full Charge" is selected, power storage device B is charged from charging station 30 until power storage device B is fully charged.

Figure 12:
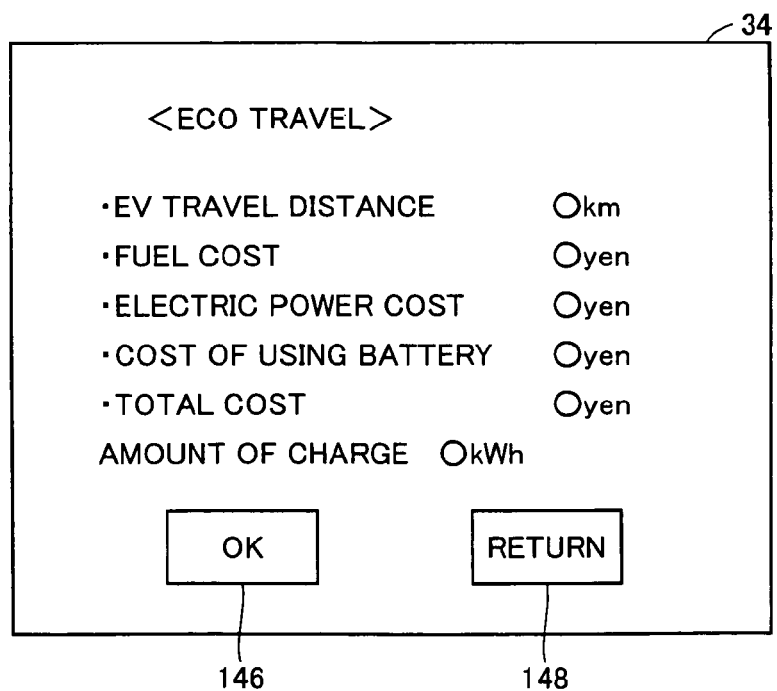
FIG. 12 is a diagram showing an exemplary cost display screen of a display device.

FIG. 12 is a diagram showing an exemplary cost display screen of display device 34. Referring to FIG. 12, when a user selects any of the menu items from the menu selection screen shown in FIG. 11, display device 34 presents, for the selected menu item, the EV travel distance, respective predicted values of the fuel cost, the electric power cost (charge cost), the cost of using power storage device B, and the total cost, as well as the predicted value of the amount of charge from charging station 30 to power storage device B.

Specifically, display device 34 presents to the user the cost (energy cost and cost of using power storage device B) for the next travel, in association with the amount of charge from charging station 30 to power storage device B. When a region 146 is selected, charge ECU 32 is informed of the selection. When a region 148 is selected, the state of display returns to the menu selection screen shown in FIG. 11. Here, as the predicted value of the amount of charge to power storage device B, the electric power consumption of power storage device B is presented.

Referring again to FIG. 8, charge command output unit 122 transmits to vehicle 10 via connection cable 20, a charge command to charge the power storage device by the amount of charge associated with the menu item selected by the user on display device 34.

Figure 13:
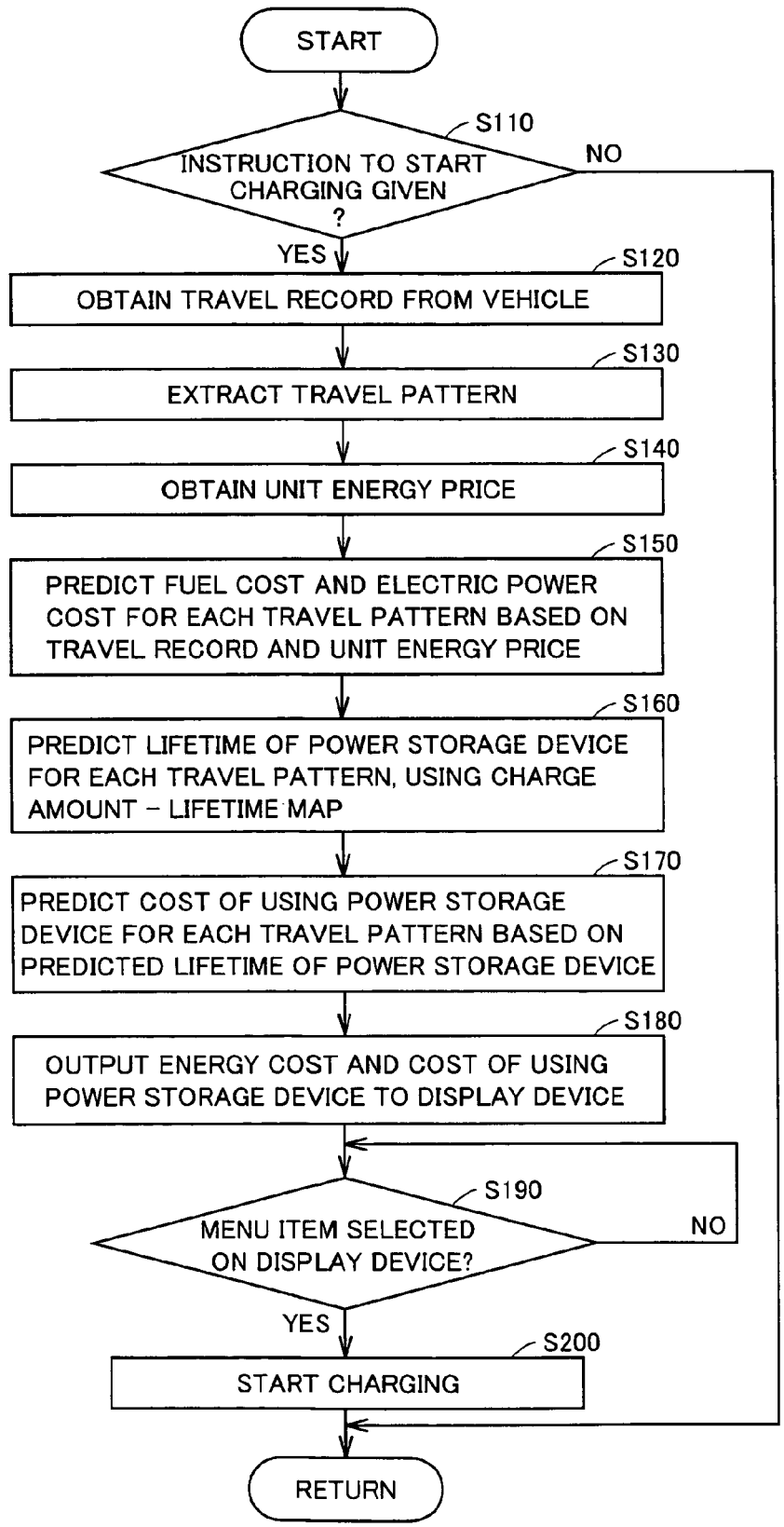
FIG. 13 is a flowchart illustrating a control structure of the charge ECU shown in FIG. 1.

FIG. 13 is a flowchart illustrating a control structure of charge ECU 32 shown in FIG. 1. The process of the flowchart is called from a main routine and executed at regular time intervals or each time a predetermined condition is satisfied.

Referring to FIG. 13, charge ECU 32 determines whether or not a user instructs to start charging power storage device B of vehicle 10 from charging station 30 (step S110). The instruction to start charging may be input by the user from display device 34 for example.

When charge ECU 32 determines that the instruction to start charging is given YES in step S110), charge ECU 32 obtains travel records (including the fuel consumption of engine 204 and the electric power consumption of power storage device B) of vehicle 10 from vehicle 10 via connection cable 20 (step S120). Then, charge ECU 32 extracts a travel pattern of vehicle 10 based on the obtained travel records (step S130). Further, charge ECU 32 obtains unit fuel price COST1 and unit price of the charging electric power COST2 from server 40 (step S140).

For each travel pattern extracted in step S130, charge ECU 32 predicts the fuel cost by multiplying the fuel consumption of engine 204 by unit fuel price COST1, and predicts the electric power cost by multiplying the electric power consumption of power storage device B by unit price of the charging electric power COST2 (step S150).

Then, charge ECU 32 obtains charge amount—lifetime map MAP from server 40 and uses the obtained charge amount—lifetime map MAP to predict the lifetime of power storage device B for each travel pattern, based on the electric power consumption of power storage device B (corresponding to the amount of charge from charging station 30 to power storage device B) (step S160).

Further, charge ECU 32 obtains from server 40 replacement cost COST3 of power storage device B (the price of power storage device B and the cost required for replacement of power storage device B), and predicts the cost of using power storage device B by dividing the obtained replacement cost COST3 by the predicted lifetime of power storage device B, for each travel pattern (step S170).

Then, charge ECU 32 outputs to display device 34 the energy cost (the fuel cost and the electric power cost) and the cost of using power storage device B that are predicted for each travel pattern (step S180). Then, charge ECU 32 determines whether or not a user inputs selection of a menu item on display device 34 (step S190).

When a menu item on display device 34 is selected by a user (YES in step S190), charge ECU 32 outputs a charge command to charge the power storage device by the amount of charge associated with the selected menu item to vehicle 10 via connection cable 20. Accordingly, charging of power storage device B of vehicle 10 is started (step S200).

While the three travel patterns are extracted based on travel records according to the description above, the number of extracted travel patterns is not limited to three. From a plurality of extracted travel patterns, a travel pattern that is not found from the past travel records may be learned. For example, from the three travel patterns shown in FIG. 9, a travel pattern where the EV travel distance is still longer may be learned and a predictive calculation of the cost and the amount of charge may be performed for the learned travel pattern.

In this way, the first embodiment predicts, before power storage device B of vehicle 10 is charged from charging station 30, the energy cost (the fuel cost and the electric power cost) for the next travel as well as the cost of using power storage device B based on the past travel records, and presents the predicted costs together with the amount of charge to power storage device B to a user by means of display device 34. According to a user's instruction from display device 34, an instruction is given to charge power storage device B.

As seen from above, in accordance with the first embodiment, a user can select the amount of charge to power storage device B of vehicle 10 from charging station 30, in consideration of the cost of using power storage device B together with the energy cost.

Second Embodiment

In the first embodiment, the energy cost and the cost of using power storage device B are predicted based on travel records in the past. In the present second embodiment, the energy cost and the cost of using power storage device B are predicted based on a travel route that is set by a navigation device of the vehicle.

Figure 14:
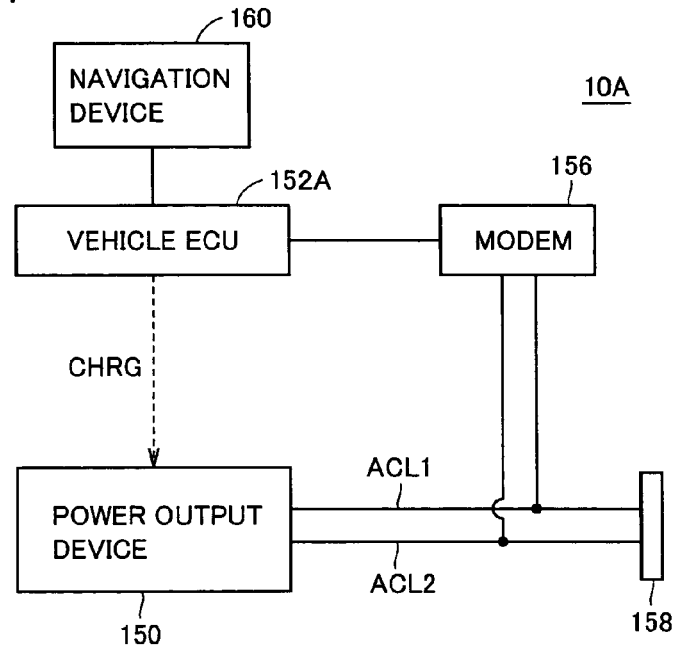
FIG. 14 is a schematic configuration diagram of a vehicle in a second embodiment.

FIG. 14 is a schematic configuration diagram of a vehicle in the second embodiment. Referring to FIG. 14, vehicle 10A includes, as compared with the configuration of vehicle 10 in the first embodiment shown in FIG. 2, a navigation device 160 instead of storage unit 154 and includes a vehicle ECU 152A instead of vehicle ECU 152.

Navigation device 160 is configured to display the present position of the vehicle and to allow a user to set a destination and a travel route to the destination. When a destination is set by a user, navigation device 160 outputs to vehicle ECU 152A the travel route information including items such as the destination, the travel route to the destination and the travel distance to the destination.

When connector 158 is connected to charging station 30, vehicle ECU 152A uses modem 156 to output the travel route information received from navigation device 160 to charging station 30 via electric power lines ACL1, ACL2.

In the second embodiment, the travel route information set by navigation device 160 is used instead of travel records for performing a predictive calculation of the energy cost and the cost of using power storage device B by the charge ECU of charging station 30, as described hereinlater. It is therefore unnecessary to collect travel records and transmit the travel records to charging station 30 as done by vehicle ECU 152 in the first embodiment. Other features of vehicle ECU 152A are similar to those of vehicle ECU 152 in the first embodiment.

Figure 15:
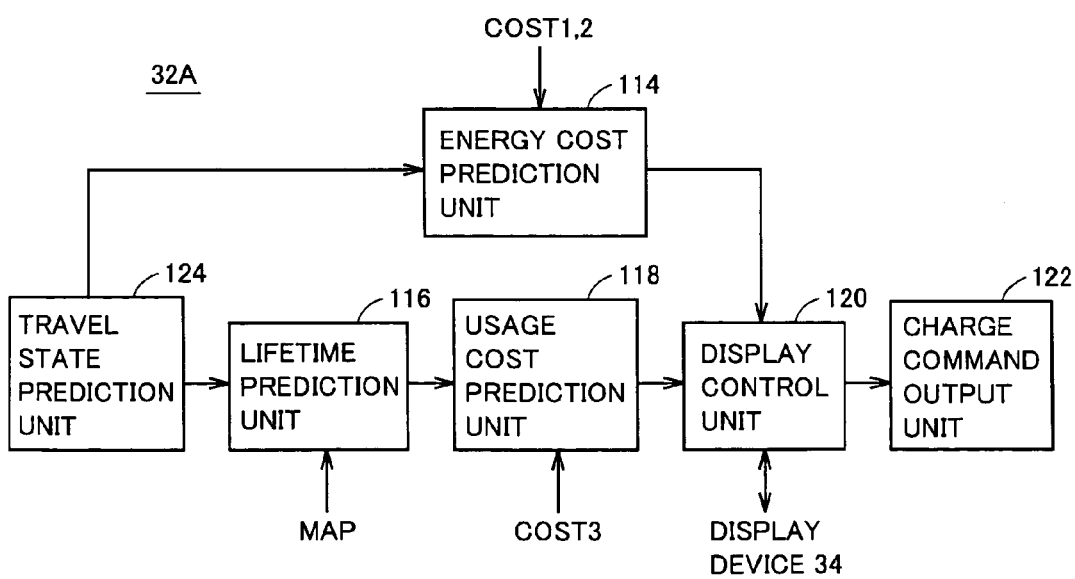
FIG. 15 is a functional block diagram of a charge ECU in the second embodiment.

FIG. 15 is a functional block diagram of a charge ECU in the second embodiment. Referring to FIG. 15, charge ECU 32A includes, as compared with the configuration of charge ECU 32 in the first embodiment shown in FIG. 8, a travel state prediction unit 124 instead of travel pattern extraction unit 112.

Travel state prediction unit 124 obtains from vehicle 10A the travel route information concerning the next travel as set by navigation device 160 of vehicle 10A. Travel state prediction unit 124 also obtains from server 40 the information concerning the road gradient of the travel route included in the obtained travel route information. Based on the obtained travel route information and the obtained information concerning the road gradient, travel state prediction unit 124 predicts travel states for a plurality of travel patterns. Specifically, for a plurality of travel patterns each, the fuel consumption of engine 204 and the electric power consumption of power storage device B are predicted. As for a plurality of travel patterns, a plurality of travel patterns as shown in FIG. 9 are prepared. The information concerning the road gradient of the travel route may be held by navigation device 160 of vehicle 10A.

Energy cost prediction unit 114 predicts, for each travel pattern, the fuel cost and the electric power cost using the fuel consumption of engine 204 and the electric power consumption of power storage device B that are predicted by travel state prediction unit 124. Lifetime prediction unit 116 predicts, for each travel pattern, the lifetime of power storage device B using the electric power consumption of power storage device B that is predicted by travel state prediction unit 124.

Other features of charge ECU 32A are similar to those of charge ECU 32 in the first embodiment.

Figure 16:
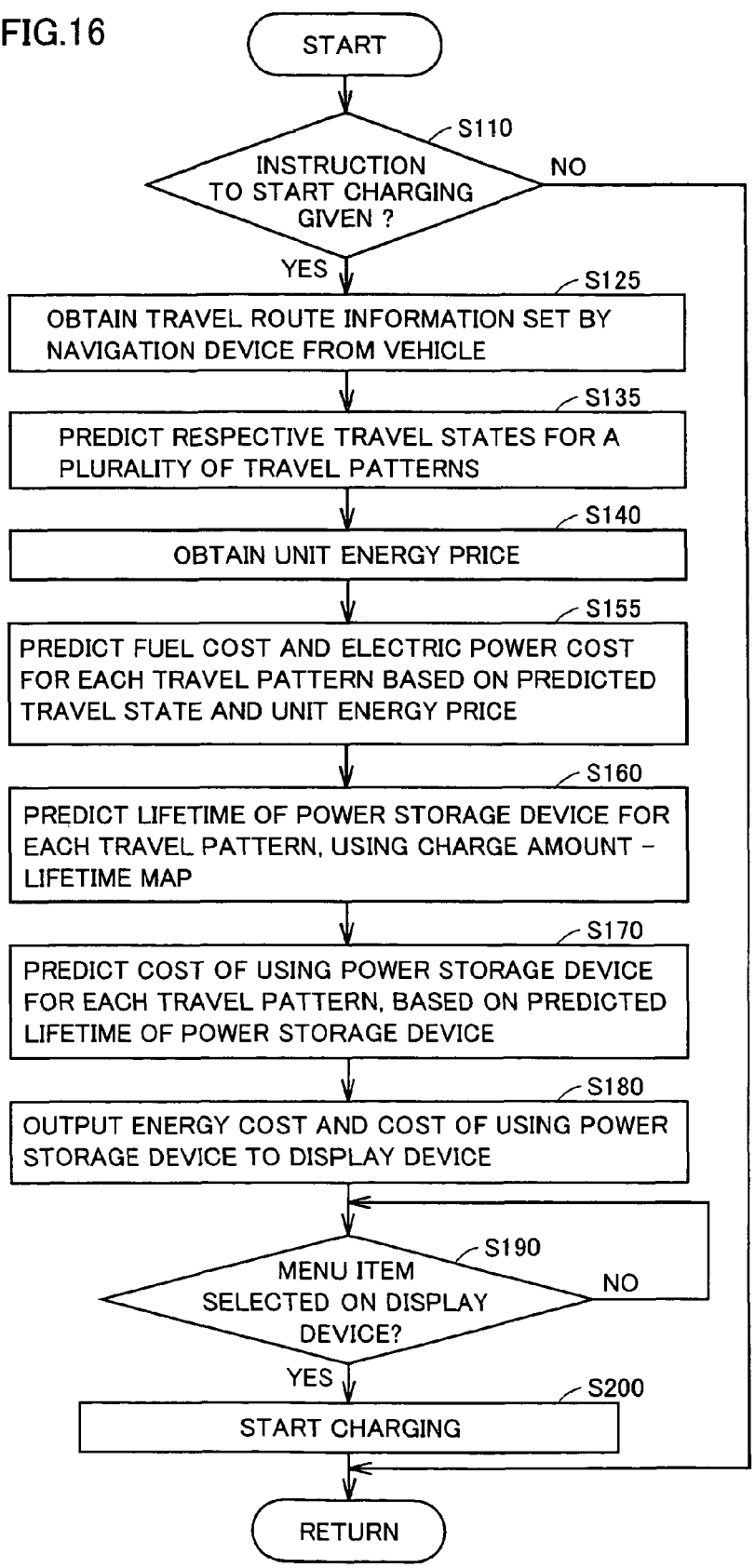
FIG. 16 is a flowchart illustrating a control structure of the charge ECU in the second embodiment.

FIG. 16 is a flowchart illustrating a control structure of charge ECU 32A in the second embodiment. The process of the flowchart is also called from a main routine and executed at regular time intervals or each time a predetermined condition is satisfied.

Referring to FIG. 16, the flowchart includes steps S125, S135 and S155 instead of steps S120, S130, S150 respectively in the flowchart shown in FIG. 13. Specifically, when it is determined that an instruction to start charging is given in step S110, charge ECU 32A obtains travel route information set by navigation device 160 of vehicle 10A, from vehicle 10A via connection cable 20 (step S125).

Then, charge ECU 32A predicts the state of travel of vehicle 10A for each of a plurality of travel patterns, based on the obtained travel route information (step S135). Specifically, charge ECU 32A obtains from server 40 the information concerning the road gradient of the travel route included in the obtained travel route information, and predicts the fuel consumption of engine 204 and the electric power consumption of power storage device B for each of a plurality of travel patterns, in consideration of the distance and the road gradient of the travel route to the destination for example.

When unit fuel price COST1 and unit price of the charging electric power COST2 are obtained from server 40 in step S140, charge ECU 32A predicts the fuel cost by multiplying the fuel consumption of engine 204 as predicted in step S135 by unit fuel price COST1, and predicts the electric power cost by multiplying the electric power consumption of power storage device B as predicted in step S135 by unit price of the charging electric power COST2, for each travel pattern (step S155). Charge ECU 32A then proceeds to step S160 in the process.

As seen from above, the second embodiment uses the travel route information set by navigation device 160 instead of travel records in the first embodiment. The second embodiment can therefore achieve similar effects to those of the first embodiment without collecting travel records by the vehicle.

Third Embodiment

In the present third embodiment, operations performed by charging station 30 in the first embodiment are all performed by the vehicle.

Figure 17:
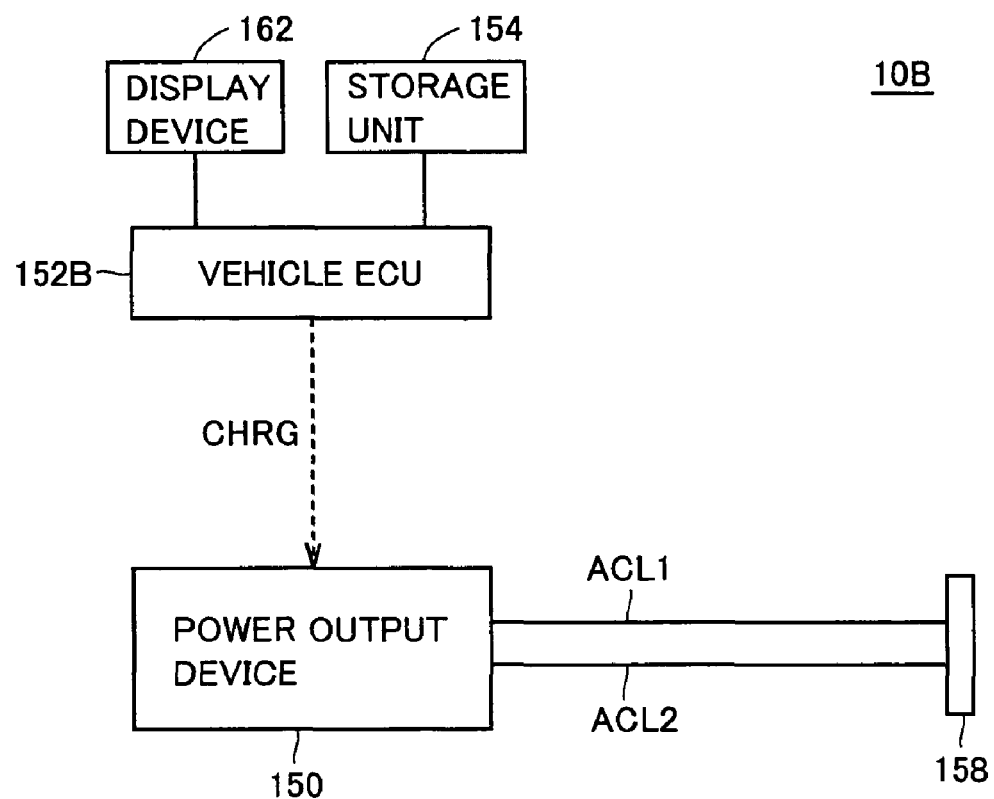
FIG. 17 is a schematic configuration diagram of a vehicle in a third embodiment.

FIG. 17 is a schematic configuration diagram of a vehicle in the third embodiment. Referring to FIG. 17, as compared with the configuration of vehicle 10 in the first embodiment shown in FIG. 2, vehicle 10B does not include modem 156 but further includes a display device 162, and includes a vehicle ECU 152B instead of vehicle ECU 152.

Vehicle ECU 152B predicts, for each of a plurality of travel patterns extracted from travel records of vehicle 10B, the energy cost for the next travel of vehicle 10B and the lifetime of power storage device B according to the amount of charge from charging station 30 to power storage device B. Based on the predicted lifetime, vehicle ECU 152B predicts the cost of using power storage device B according to the amount of charge to power storage device B.

Display device 162 has functions similar to those of display device 34 in the first embodiment. Storage unit 154 stores travel records collected during the travel of the vehicle, and stores various data used by vehicle ECU 152B for performing a predictive calculation of the energy cost of vehicle 10B as well as the cost of using power storage device B. Other features of vehicle 10B are similar to those of vehicle 10.

Figure 18:
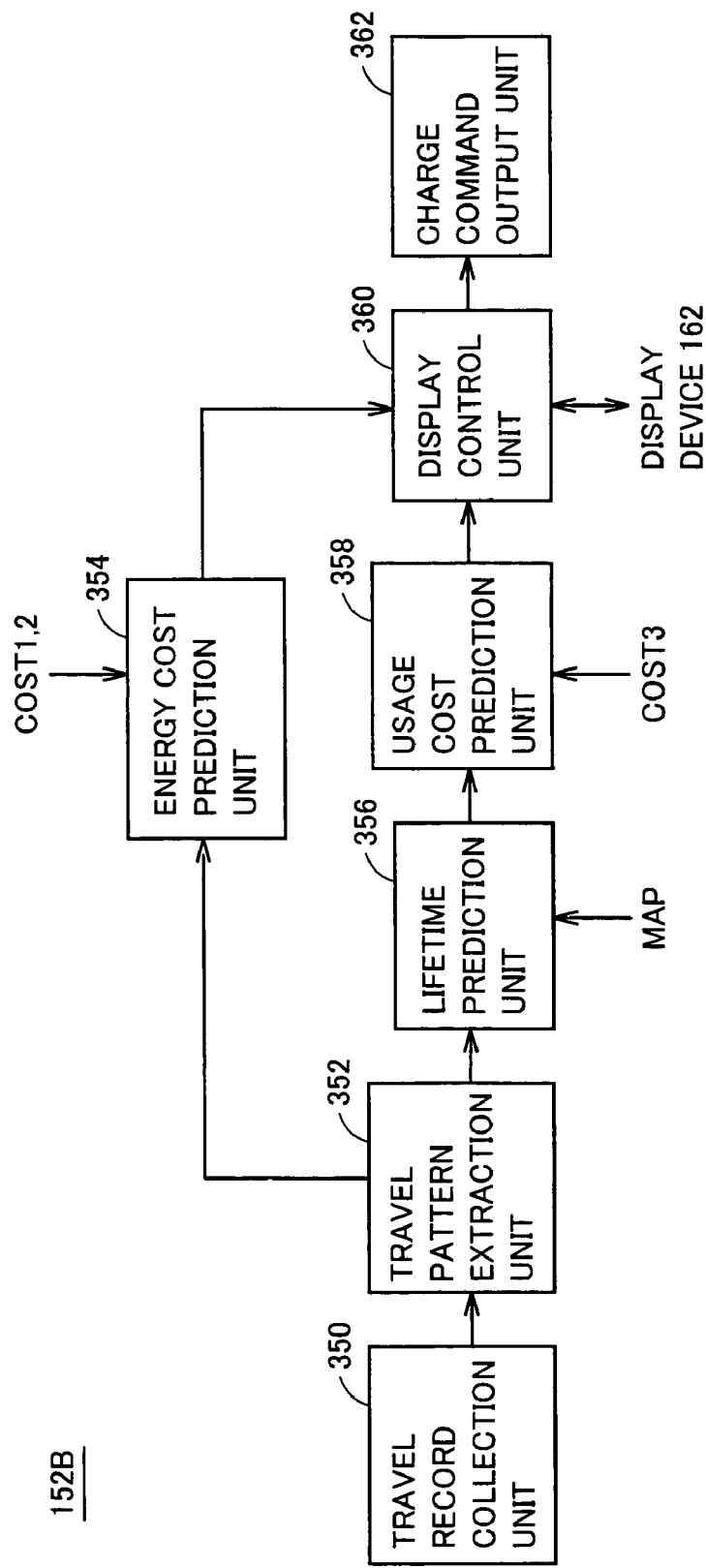
FIG. 18 is a functional block diagram of a vehicle ECU shown in FIG. 17.

FIG. 18 is a functional block diagram of vehicle ECU 152B shown in FIG. 17. Referring to FIG. 18, vehicle ECU 152B includes a travel record collection unit 350, a travel pattern extraction unit 352, an energy cost prediction unit 354, a lifetime prediction unit 356, a usage cost prediction unit 358, a display control unit 360, and a charge command output unit 362.

Travel record collection unit 350 collects travel records during the travel of the vehicle, and outputs the collected travel records to storage unit 154. Travel pattern extraction unit 352 reads from storage unit 154 the travel records collected by travel record collection unit 350, and extracts a travel pattern of vehicle 10B based on the read travel records. Here, the travel pattern is extracted in a similar manner to the one by travel pattern extraction unit 112 of charge ECU 32 in the first embodiment.

Energy cost prediction unit 354 uses unit fuel price COST1 and unit price of the charging electric power COST2 stored in storage unit 154 to calculate the energy cost for each of travel patterns extracted by travel pattern extraction unit 352.

Lifetime prediction unit 356 uses a charge amount—lifetime map MAP stored in storage unit 154 to predict the lifetime of power storage device B for each of travel patterns extracted by travel pattern extraction unit 352.

Usage cost prediction unit 358 uses replacement cost COSTS of power storage device B stored in storage unit 154 to predict the cost of using power storage device B for each of travel patterns extracted by travel pattern extraction unit 352.

Display control unit 360 controls the state of display of display device 162. In order to charge the power storage device by an amount of charge associated a menu item selected by a user on display device 162, charge command output unit 362 activates signal CHRG to be output to power output device 150, and inactivates signal CHRG when the power storage device is charged by the set amount of charge.

As seen from above, predictive calculations of the energy cost and the cost of using power storage device B are performed by vehicle 10B in the third embodiment. Therefore, according to the third embodiment, it is unnecessary to communicate travel records and charge command between vehicle 10B and charging station 30, and thus it is unnecessary to provide a communication interface for performing communication between vehicle 10B and charging station 30.

Fourth Embodiment

In the present fourth embodiment, the operations performed by charging station 30 in the second embodiment are all performed by the vehicle.

Figure 19:
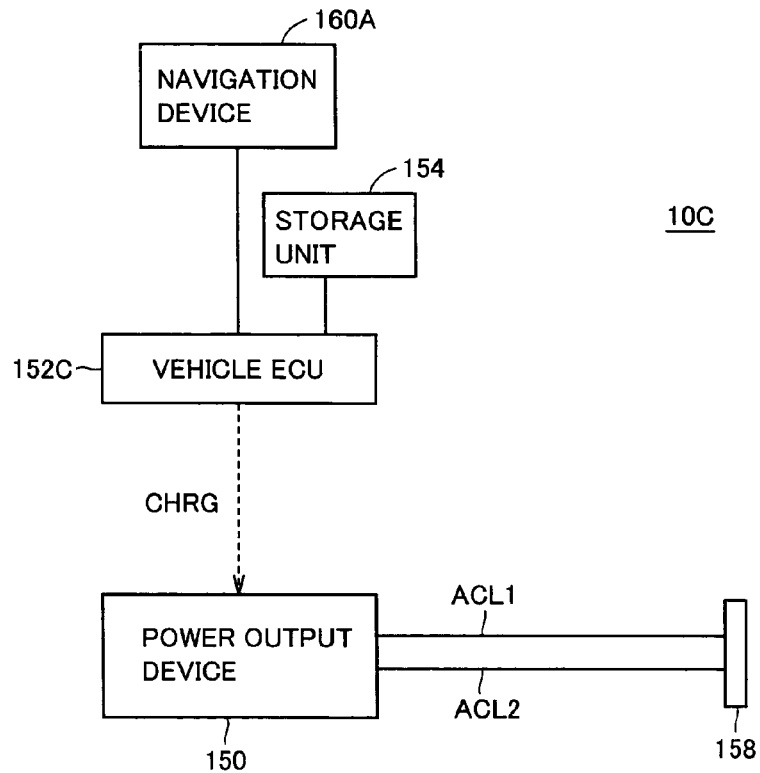
FIG. 19 is a schematic configuration diagram of a vehicle in a fourth embodiment.

FIG. 19 is a schematic configuration diagram of a vehicle in the fourth embodiment. Referring to FIG. 19, as compared with the configuration of vehicle 10A in the second embodiment shown in FIG. 14, vehicle 10C does not include modem 156 but further includes a storage unit 154, and includes a vehicle ECU 152C and a navigation device 160A instead of vehicle ECU 152A and navigation device 160 respectively.

Navigation device 160A further holds information concerning the road gradient as map information. When a user sets a destination, navigation device 160A outputs to vehicle ECU 152C travel route information including items such as the destination, a travel route to the destination, information concerning the road gradient of the travel route, and the distance of travel to the destination.

Navigation device 160A also has the functions of display device 162 shown in FIG. 17. Specifically, for each of a plurality of travel patterns, navigation device 160A displays the energy cost for the next travel and the cost of using power storage device B predicted by vehicle ECU 152C, in association with the amount of charge from charging station 30 to power storage device B.

Based on the travel route information received from navigation device 160A, vehicle ECU 152C predicts the energy cost for the next travel of vehicle 10B and the lifetime of power storage device B according to the amount of charge from charging station 30 to power storage device B, for each of a plurality of travel patterns. Based on the predicted lifetime, vehicle ECU 152C predicts the cost of using power storage device B according to the amount of charge to power storage device B.

Storage unit 154 stores various data used by vehicle ECU 152C for performing predictive calculations of the energy cost of vehicle 10C and the cost of using power storage device B. Other features of vehicle 10C are similar to those of vehicle 10A.

Figure 20:
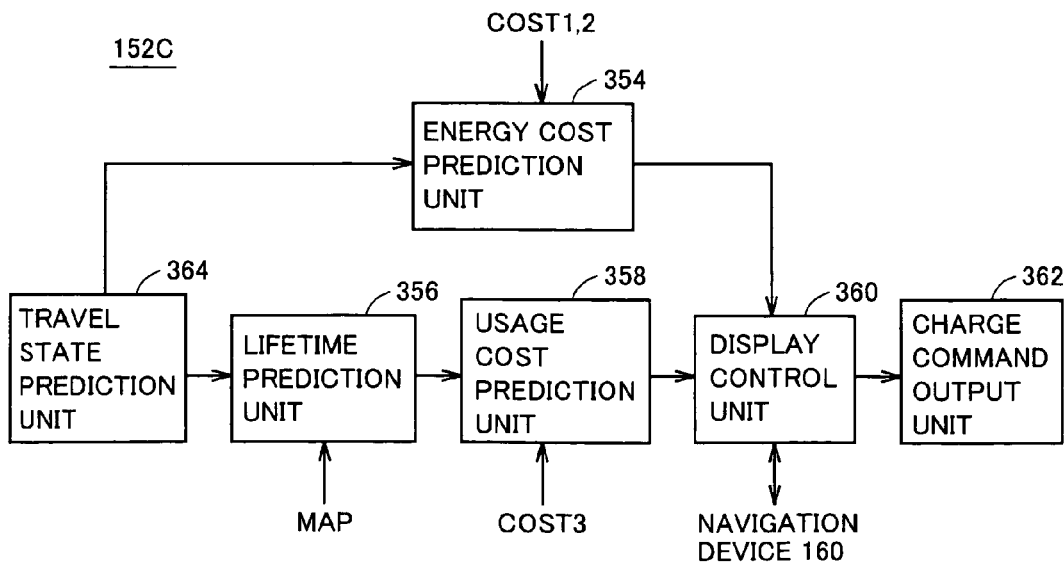
FIG. 20 is a functional block diagram of a vehicle ECU shown in FIG. 19.

FIG. 20 is a functional block diagram of vehicle ECU 152C shown in FIG. 19. Referring to FIG. 20, as compared with the configuration of vehicle ECU 152B in the third embodiment shown in FIG. 18, vehicle ECU 152C does not include travel record collection unit 350 but includes a travel state prediction unit 364 instead of travel pattern extraction unit 352.

Travel state prediction unit 364 predicts a state of travel for each of a plurality of travel patterns, based on the travel route information received from navigation device 160A. Specifically, for a plurality of travel patterns each, the fuel consumption of engine 204 and the electric power consumption of power storage device B are predicted.

Energy cost prediction unit 354 uses the fuel consumption of engine 204 and the electric power consumption of power storage device B that are predicted by travel state prediction unit 364 to predict the fuel cost and the electric power cost for each travel pattern. Lifetime prediction unit 356 uses the electric power consumption of power storage device B predicted by travel state prediction unit 364 to predict the lifetime of power storage device B for each travel pattern. Other features of vehicle ECU 152 are those as described in connection with the third embodiment above.

As seen from above, the fourth embodiment uses the travel route information that is set by navigation device 160A instead of travel records in the third embodiment. Thus, according to the fourth embodiment, travel records are not collected by the vehicle and it is unnecessary to provide a communication interface for performing communication between vehicle 10C and charging station 30.

According to the above-described second and fourth embodiments, the cost and the amount of charge are predicted for each of a plurality of travel patterns, based on the travel route set by navigation devices 160, 160A. In the case where an emission control area or noise control area is present on the travel route, the state of travel (the fuel consumption of engine 204 and the electric power consumption of power storage device B) may be predicted supposing that the vehicle is driven in the EV travel mode in this area, and predictive calculations of the cost and the amount of charge may be performed based on the predicted state of travel.

Further, in the case where such a control area is present on the travel route, "Long-Battery-Life Travel" in which the amount of charge is smaller and the EV travel distance is shorter may be restrained from being selected on the menu selection screen of display device 34 shown in FIG. 11, or "Full Charge" may be forced to be selected.

According to the above-described first and second embodiments, server 40 holds various data used by charge ECU 32 for performing predictive calculations of the energy cost and the cost of using the power storage device. Alternatively, a user may set the various data at charging station 30 or vehicles 10, 10A. Further, according to the above-described third and fourth embodiments, the various data is stored in storage unit 154. Alternatively, a user may set the various data, or the data may be downloaded from a server for example outside the vehicle by radio for example.

Further, according to the above-described first and second embodiments, the communication between vehicles 10, 10A and charging station 30 is performed by means of PLC (Power Line Communication) via connection cable 20 (electric power lines ACL1, ACL2). Alternatively, another communication line may be provided or communication may be performed by radio.

In the above-described embodiments each, the charging electric power from charging station 30 is supplied to the neutral points of motor generators MG1, MG2, and power storage device B is charged from charging station 30 by means of inverters 220, 230. Alternatively, a charging-dedicated inverter receiving the charging electric power from charging station 30 may be separately provided.

In the above-described embodiments each, the description is given of vehicles 10, 10A-10C as a series/parallel hybrid vehicle in which the power of engine 204 can be transmitted in such a manner that the power is split by power split device 203 into the one for the axle and the one for motor generator MG1. The present invention, however, is applicable to hybrid vehicles of other types. Specifically, the present invention is applicable to a so-called series hybrid vehicle in which engine 204 is used only for driving motor generator MG1 and the drive force for the vehicle is generated by motor generator MG2 only, or a motor-assisted type hybrid vehicle in which the engine is used as a primary power source and a motor assists the engine as required.

The present invention is also applicable to a vehicle without including voltage step-up converter 210.

The control performed by charge ECU 32, 32A as described above is actually performed by a CPU (Central Processing Unit). The CPU reads a program including the steps of the flowcharts shown in FIGS. 13 and 16 from a ROM (Read Only Memory), and executes the read program to perform the operations following the flowcharts shown in FIGS. 13 and 16. Therefore, the ROM corresponds to a computer (CPU)-readable recording medium on which a program is recorded that includes the steps of the flowcharts shown in FIGS. 13 and 16.

Display devices 34, 162 and navigation device 160A as described above correspond to an embodiment of "information unit" of the present invention, and charge command output units 122, 362 as described above correspond to an embodiment of "charge command generation unit" of the present invention. Further, engine 204 as described above corresponds to an embodiment of "internal combustion engine" of the present invention, and motor generator MG1 and inverter 220 as described above correspond to an embodiment of "electric power generation device" of the present invention. Further, motor generator MG2 as described above corresponds to an embodiment of "electric motor" of the present invention, and inverters 220, 230, motor generators MG1, MG2 and MG-ECU 240 as described above correspond to an embodiment of "charging device" of the present invention.

It should be construed that embodiments disclosed herein are by way of illustration in all respects, not by way of limitation. It is intended that the scope of the present invention is defined by claims, not by the above description of the embodiments, and includes all modifications and variations equivalent in meaning and scope to the claims.

The invention claimed is:

1. A charging control apparatus for an electrically powered vehicle configured in such a manner that a power storage device mounted on the vehicle is chargeable from a power supply outside the vehicle, said charging control apparatus comprising:

an energy cost prediction unit for predicting an energy cost for a next travel of the vehicle based on an energy consumption during a travel of the vehicle;

a lifetime prediction unit for predicting a lifetime of said power storage device according to an amount of charge to said power storage device, using a relation between an amount of charge to said power storage device and a lifetime of said power storage device;

a usage cost prediction unit for predicting a cost of using said power storage device according to the amount of charge to said power storage device, based on the lifetime of said power storage device predicted by said lifetime prediction unit;

an information unit for informing a user of said energy cost and the cost of using said power storage device in association with the amount of charge to said power storage device; and a charge command generation unit for generating a command to charge said power storage device from said power supply in accordance with an instruction from said user.

2. The charging control apparatus for an electrically powered vehicle according to claim 1, wherein said electrically powered vehicle includes:

an internal combustion engine;

an electric power generation device configured to be able to generate electric power using an output of said internal combustion engine;

said power storage device capable of storing the electric power generated by said electric power generation device;

an electric motor for generating a drive force for causing the vehicle to travel, from the electric power received from said power storage device;

a travel record collection unit for collecting and storing a travel record during a travel of the vehicle; and a charging device configured to be able to charge said power storage device with electric power received from said power supply outside the vehicle, said energy cost prediction unit calculates a fuel consumption of said internal combustion engine and an electric power consumption of said power storage device based on the travel record collected by said travel record collection unit, and predicts a fuel cost and an electric power cost for the next travel based on the calculated fuel consumption and the calculated electric power consumption, and said lifetime prediction unit predicts the lifetime of said power storage device using said calculated electric power consumption of said power storage device as the amount of charge with which said power storage device is charged by said charging device.

3. The charging control apparatus for an electrically powered vehicle according to claim 1, wherein said electrically powered vehicle includes:

an internal combustion engine;

an electric power generation device configured to be able to generate electric power using an output of said internal combustion engine;

said power storage device capable of storing the electric power generated by said electric power generation device;

an electric motor for generating a drive force for causing the vehicle to travel, from the electric power received from said power storage device;

a navigation device capable of setting a travel route; and a charging device configured to be able to charge said power storage device with electric power received from said power supply outside the vehicle, said energy cost prediction unit calculates a fuel consumption of said internal combustion engine and an electric power consumption of said power storage device based on the travel route set by said navigation device, and predicts a fuel cost and an electric power cost for the next travel based on the calculated fuel consumption and the calculated electric power consumption, and said lifetime prediction unit predicts the lifetime of said power storage device using said calculated electric power consumption of said power storage device as the amount of charge with which said power storage device is charged by said charging device.

4. The charging control apparatus for an electrically powered vehicle according to claim 2, wherein said electrically powered vehicle further includes a travel mode control unit for controlling switching of a travel mode including a first mode where a target of a state amount indicating a state of charge of said power storage device is not set and a second mode where the target of said state amount is set.

5. The charging control apparatus for an electrically powered vehicle according to claim 4, wherein said travel mode control unit sets said travel mode to said first mode after completion of charging of said power storage device by said charging device, switches said travel mode to said second mode when said state amount decreases to approach a specified value indicating the target of said state amount, and thereafter controls electric power generation by said electric power generation device in such a manner that said state amount is around said specified value.

6. An electrically powered vehicle comprising:

a chargeable and dischargeable power storage device;

an electric motor for generating a drive force for causing the vehicle to travel, from electric power received from said power storage device;

a charging device configured to be able to charge said power storage device with electric power received from a power supply outside the vehicle;

an energy cost prediction unit for predicting an energy cost for a next travel of the vehicle based on an energy consumption during a travel of the vehicle;

a lifetime prediction unit for predicting a lifetime of said power storage device according to an amount of charge to said power storage device, using a relation between an amount of charge to said power storage device and a lifetime of said power storage device;

a usage cost prediction unit for predicting a cost of using said power storage device according to the amount of charge to said power storage device, based on the lifetime of said power storage device predicted by said lifetime prediction unit;

an information unit for informing a user of said energy cost and the cost of using said power storage device in association with the amount of charge to said power storage devices; and a charging control unit for controlling charging to said power storage device from said power supply by said charging device in accordance with an instruction from said user.

7. The electrically powered vehicle according to claim 6, further comprising:

an internal combustion engine;

an electric power generation device configured to be able to generate electric power using an output of said internal combustion engine; and a travel record collection unit for collecting and storing a travel record during a travel of the vehicle, wherein said power storage device is able to store the electric power generated by said electric power generation device, said energy cost prediction unit calculates a fuel consumption of said internal combustion engine and an electric power consumption of said power storage device based on the travel record collected by said travel record collection unit, and predicts a fuel cost and an electric power cost for the next travel based on the calculated fuel consumption and the calculated electric power consumption, and said lifetime prediction unit predicts the lifetime of said power storage device using said calculated electric power consumption of said power storage device as the amount of charge with which said power storage device is charged by said charging device.

8. The electrically powered vehicle according to claim 6, further comprising:

an internal combustion engine;

an electric power generation device configured to be able to generate electric power using an output of said internal combustion engine; and a navigation device capable of setting a travel route, wherein said power storage device is able to store the electric power generated by said electric power generation device, said energy cost prediction unit calculates a fuel consumption of said internal combustion engine and an electric power consumption of said power storage device based on the travel route set by said navigation device, and predicts a fuel cost and an electric power cost for the next travel based on the calculated fuel consumption and the calculated electric power consumption, and said lifetime prediction unit predicts the lifetime of said power storage device using said calculated electric power consumption of said power storage device as the amount of charge with which said power storage device is charged by said charging device.

9. The electrically powered vehicle according to claim 7, further comprising a travel mode control unit for controlling switching of a travel mode including a first mode where a target of a state amount indicating a state of charge of said power storage device is not set and a second mode where the target of said state amount is set.

10. The electrically powered vehicle according to claim 9, wherein said travel mode control unit sets said travel mode to said first mode after completion of charging of said power storage device by said charging device, switches said travel mode to said second mode when said state amount decreases to approach a specified value indicating the target of said state amount, and thereafter controls electric power generation by said electric power generation device in such a manner that said state amount is around said specified value.

11. A method for charging control for an electrically powered vehicle configured in such a manner that a power storage device mounted on the vehicle is chargeable from a power supply outside the vehicle, comprising the steps of:

predicting an energy cost for a next travel of the vehicle based on an energy consumption during a travel of the vehicle;

predicting a lifetime of said power storage device according to an amount of charge to said power storage device, using a relation between an amount of charge to said power storage device and a lifetime of said power storage device;

predicting a cost of using said power storage device according to the amount of charge to said power storage device, based on the predicted lifetime of said power storage device;

informing a user of said energy cost and the cost of using said power storage device in association with the amount of charge to said power storage device; and generating a command to charge said power storage device from said power supply in accordance with an instruction from said user.

12. The method for charging control for an electrically powered vehicle according to claim 11, further comprising the step of collecting a travel record during a travel of said electrically powered vehicle, wherein
said electrically powered vehicle includes:
an internal combustion engine;
an electric power generation device configured to be able to generate electric power using an output of said internal combustion engine;
said power storage device capable of storing the electric power generated by said electric power generation device;
an electric motor for generating a drive force for causing the vehicle to travel, from the electric power received from said power storage device; and
a charging device configured to be able to charge said power storage device with electric power received from said power supply outside the vehicle,
in said step of predicting an energy cost, a fuel consumption of said internal combustion engine and an electric power consumption of said power storage device are calculated based on the travel record collected in said step of collecting a travel record, and a fuel cost and an electric power cost for the next travel are predicted based on the calculated fuel consumption and the calculated electric power consumption, and
in said step of predicting a lifetime of said power storage device, the lifetime of said power storage device is predicted using said calculated electric power consumption of said power storage device as the amount of charge with which said power storage device is charged by said charging device.

13. The method for charging control for an electrically powered vehicle according to claim 11, wherein
said electrically powered vehicle includes:
an internal combustion engine;
an electric power generation device configured to be able to generate electric power using an output of said internal combustion engine;
said power storage device capable of storing the electric power generated by said electric power generation device;
an electric motor for generating a drive force for causing the vehicle to travel, from the electric power received from said power storage device;
a navigation device capable of setting a travel route; and
a charging device configured to be able to charge said power storage device with electric power received from said power supply outside the vehicle,
in said step of predicting an energy cost, a fuel consumption of said internal combustion engine and an electric power consumption of said power storage device are calculated based on the travel route set by said navigation device, and a fuel cost and an electric power cost for the next travel are predicted based on the calculated fuel consumption and the calculated electric power consumption, and
in said step of predicting a lifetime of said power storage device, the lifetime of said power storage device is predicted using said calculated electric power consumption of said power storage device as the amount of charge with which said power storage device is charged by said charging device.

14. A computer-readable recording medium having a program recorded thereon for a computer to execute the charging control for an electrically powered vehicle as recited in claim 11.

* * * * *